(12) United States Patent
Kamohara

(10) Patent No.: US 8,375,147 B2
(45) Date of Patent: Feb. 12, 2013

(54) ELECTRONIC DEVICE

(75) Inventor: Tadashi Kamohara, Ibaraki (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/804,001

(22) Filed: Jul. 12, 2010

(65) Prior Publication Data
US 2011/0032425 A1 Feb. 10, 2011

(30) Foreign Application Priority Data

Aug. 5, 2009 (JP) .............................. P2009-182093

(51) Int. Cl.
G06F 3/00 (2006.01)
G06F 13/00 (2006.01)
G06F 5/00 (2006.01)

(52) U.S. Cl. ................... 710/3; 710/15; 710/31; 710/37

(58) Field of Classification Search ...................... 710/15
See application file for complete search history.

(56) References Cited

U.S. PATENT DOCUMENTS

| | | | |
|---|---|---|---|
| 2006/0256241 A1* | 11/2006 | Suzuki et al. | 348/706 |
| 2008/0134237 A1* | 6/2008 | Tu et al. | 725/38 |
| 2008/0186403 A1* | 8/2008 | Douillet | 348/461 |
| 2008/0285589 A1* | 11/2008 | Diab | 370/466 |
| 2009/0089850 A1* | 4/2009 | Nakajima et al. | 725/118 |
| 2009/0141180 A1* | 6/2009 | Kondo et al. | 348/723 |
| 2009/0158371 A1* | 6/2009 | Lo | 725/110 |
| 2009/0252176 A1 | 10/2009 | Morita et al. | |
| 2009/0284656 A1 | 11/2009 | Suzuki et al. | |
| 2009/0288126 A1* | 11/2009 | Candelore et al. | 725/110 |
| 2010/0157169 A1* | 6/2010 | Yoshida et al. | 348/734 |
| 2010/0189104 A1* | 7/2010 | Ichimura | 370/389 |
| 2010/0194765 A1* | 8/2010 | Nakamura | 345/520 |
| 2010/0201838 A1* | 8/2010 | Yamada | 348/222.1 |
| 2010/0269128 A1* | 10/2010 | Gordon | 725/25 |
| 2010/0299698 A1* | 11/2010 | Douillet | 725/31 |
| 2011/0018976 A1* | 1/2011 | Park | 348/51 |
| 2011/0099415 A1* | 4/2011 | Terauchi et al. | 714/5.1 |
| 2011/0154406 A1* | 6/2011 | Koo et al. | 725/56 |

FOREIGN PATENT DOCUMENTS

JP 2007-235584 A 9/2007
JP 2008-035192 A 2/2008

OTHER PUBLICATIONS

High-Definition Multimedia Interface Specification Version 1.3a, Nov. 10, 2006, pp. ii-156 and Supplement 1 Consumer Electronics Control (CEC), pp. i-97.

* cited by examiner

Primary Examiner — Chun_Kuan Lee
Assistant Examiner — Ronald Modo
(74) Attorney, Agent, or Firm — Lerner, David, Littenberg, Krumholz & Mentlik, LLP

(57) ABSTRACT

An electronic device includes a response-request transmitting unit and a response receiving unit. The response-request transmitting unit transmits a response request including an identifier of the response-request transmitting unit on a second network to an external device through a first net work. The response receiving unit that receives a response including an identifier of the external device on the first network, transmitted through the second network in response to the response request.

11 Claims, 18 Drawing Sheets

FIG. 7

| PIN | SIGNAL ASSIGNMENT |
|---|---|
| 1 | TMDS DATA2+ |
| 3 | TMDS DATA2− |
| 5 | TMDS DATA1 SHIELD |
| 7 | TMDS DATA0+ |
| 9 | TMDS DATA0− |
| 11 | TMDS CLOCK SHIELD |
| 13 | CEC |
| 15 | SCL |
| 17 | DDC/CEC GROUND |
| 19 | HOT PLUG DETECT |

| PIN | SIGNAL ASSIGNMENT |
|---|---|
| 2 | TMDS DATA2 SHIELD |
| 4 | TMDS DATA1+ |
| 6 | TMDS DATA1− |
| 8 | TMDS DATA0 SHIELD |
| 10 | TMDS CLOCK+ |
| 12 | TMDS CLOCK− |
| 14 | RESERVED (N. C. ON DEVICE) |
| 16 | SDA |
| 18 | +5V POWER |

LOGICAL ADDRESS

FIG. 11

| 8 BYTES | 6 BYTES | 6 BYTES | 2 BYTES | 46 TO 1500 BYTES | 4 BYTES |
|---|---|---|---|---|---|
| PREAMBLE | DESTINATION MAC ADDRESS | SOURCE MAC ADDRESS | ETHERTYPE | DATA (TCP/IP ETC.) | FCS |

FIG. 12

| DLNA DEVICE NAME | IP ADDRESS | ETHER MAC ADDRESS |
|---|---|---|
| VIDEO ABCD | 192.168.1.9 | 00:00:00:00:00:01 |
| AABD VIDEO | 192.168.1.21 | 00:00:00:00:11:02 |
| VIDEO 1234 | 192.168.1.2 | 00:00:00:00:15:01 |

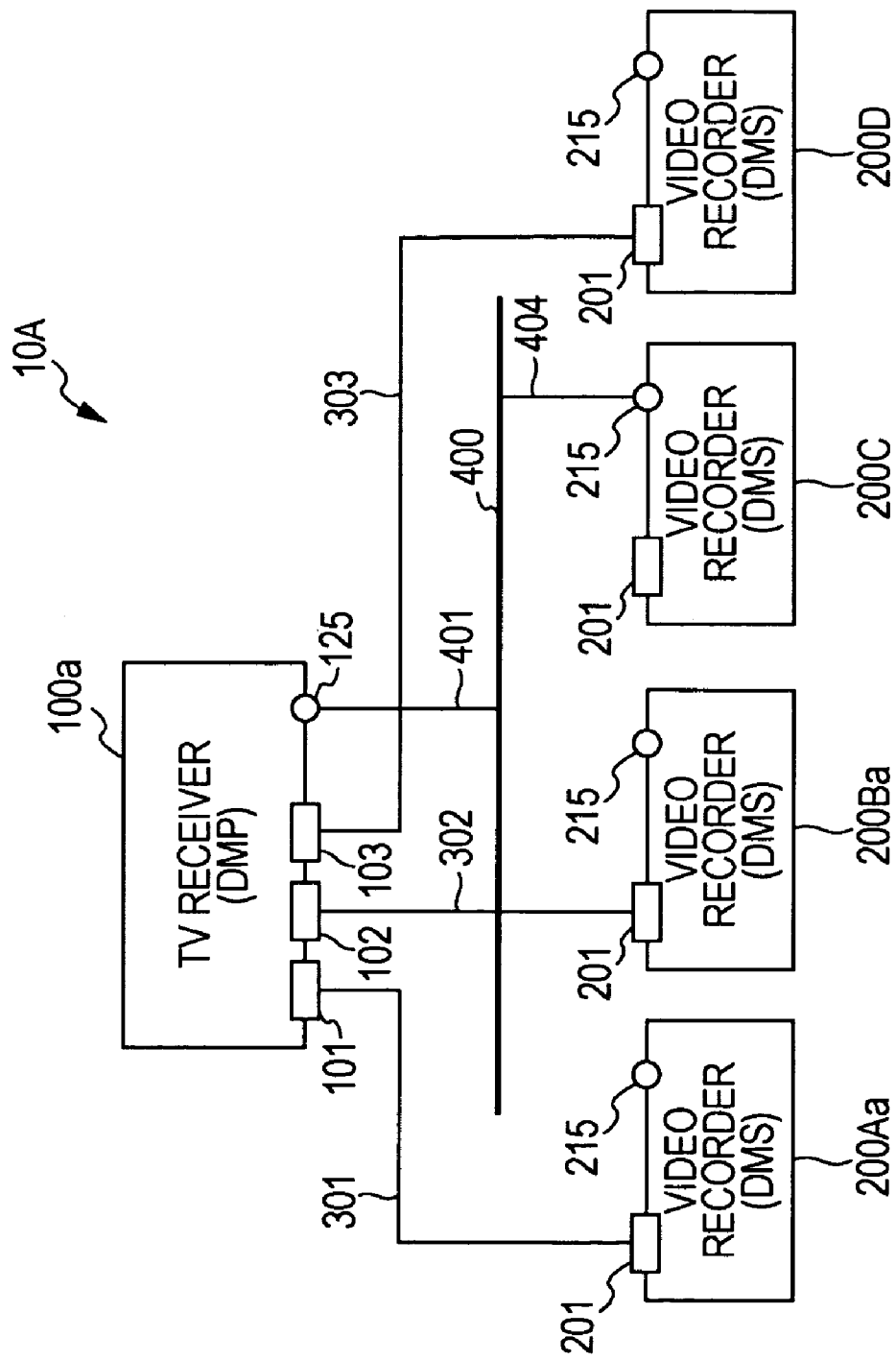

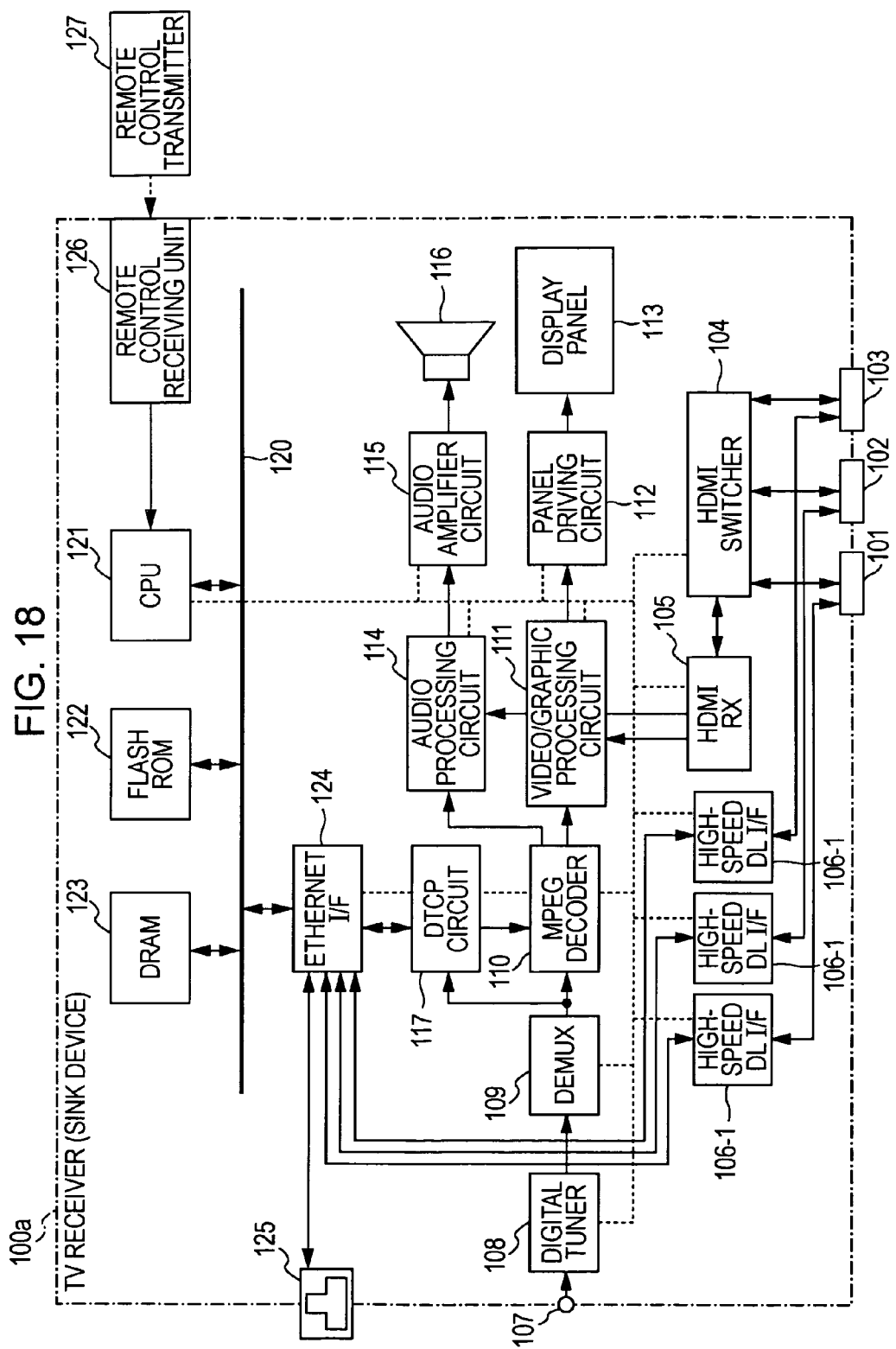

ELECTRONIC DEVICE

CROSS-REFERENCE TO RELATED APPLICATION

The present application claims priority from Japanese Patent Application No. JP 2009-182093 filed in the Japanese Patent Office on Aug. 5, 2009, the entire content of which is incorporated herein by reference.

BACKGROUND OF THE INVENTION

1. Field of the Invention

The present invention relates to an electronic device, and particularly relates to an electronic device that receives contents data from an external device or transmits contents data to an external device.

2. Description of the Related Art

In recent years, High Definition Multimedia Interface (HDMI) has been becoming popular to be used as a communication interface for high-speed transmission of digital video signals and the accompanying digital audio signals thereof from a digital versatile disc (DVD) recorder, a set top box (STB), or any of other audio visual (AV) sources to a TV receiver, a projector, or any of other display devices (see, for example, High-Definition Multimedia Interface Specification Version 1.3a, Nov. 10, 2006).

In recent years, furthermore, electronic devices compatible with the Digital Living Network Alliance (DLNA) have been proposed. The DLNA is an industrial organization established for easy connections between devices of different manufacturers in industries of household appliances, mobile devices, and personal computers. For example, a TV receiver having a function of DLNA-compatible client (digital media player: DMP) allows the user to watch and listen to contents from a video recorder having a function of DLNA-compatible server (digital media server: DMS) connected to the TV receiver through the Ethernet (registered trademark).

For example, Japanese Published Patent Application No. 2008-035192 describes a display device that represents the connection states of devices in a HDMI/CEC network. Furthermore, for example, Japanese Published Patent Application No. 2007-235584 describes a gateway device for mutual conversion between a plug-and-play process and the UPnP AV action on the Ethernet.

SUMMARY OF THE INVENTION

Note that the devices described in the aforementioned documents have the following points of concern:

(1) There is no unique device identifier in the network of HDMI/CEC. The CEC physical addresses, which are assigned to the respective devices in order of connection to the network of HDMI/CEC, are unique identifiers for identifying these respective devices. However, the CEC physical address may be often changed with the connection state of the device to the network and the sequence of starting the devices.

For example, it is considered that a digital television set (DTV), a HDMI sink device, recognizes a digital versatile disc (DVD) player, a source device, on the HDMI/CEC network. A direct connection of the DVD with the DVD player and an indirect connection of the DVD with the DVD player through an AV amplifier having an HDMI repeater function are assigned with different CEC physical addresses even though these DVD players are identical. Therefore, the digital television set (DTV) does not recognize this DVD player c as the same device in these cases.

The function and class of such a device can be acquired with reference to the CEC physical address of the device, but the unique identifier of the device is hardly obtained. For example, when two more DVD players manufactured by the same manufacturer are connected to a DTV, the respective DVD players are not exactly distinguished by the DTV.

On the other hand, when each of the devices is connected to the DTV through the Ethernet, the DTV can distinguish the connected devices using MAC or IP addresses, the unique identifiers of the respective devices. These identifiers may be used in the HDMI/CEC network to allow the DTV to correctly distinguish the devices being connected thereto.

(2) There is no means for detecting a state of Ethernet connection in a device connected by HDMI. There is no means for detecting whether devices connected to each other through HDMI are also connected and communicatable with each other through the Ethernet. There is no mechanism for exchanging meta information for qualifying contents, such as information about program names, recording time and date, channels, and performers, in the HDMI/CEC network.

Instead, these kinds of information are commonly exchanged through the Ethernet. When the devices communicated to each other through the HDMI/CEC network further establish Ethernet communications with each other, a mechanism for making a close connection between the identifiers of the devices on the HDMI and the identifiers of the devices on the Ethernet is desired. However, any means for such a mechanism has not been known in the art.

(3) There is no means for detecting the identifiers of the devices on the Ethernet when the devices have been connected to each other through the HDMI. When the devices connected to each other through the HDMI intend to make an additional communication over the Ethernet, there is no means for detecting their identifiers, such as MAC addresses or IP addresses, on the Ethernet.

(4) There is no means for detecting the state of HDMI connection between the devices recognized on the Ethernet. There is no means for detecting whether the HDMI connection is established between the devices which are being communicated with each other through the Ethernet. Typically, payers which can reproduce video contents establish communications with servers storing the video contents through the Ethernet. The players acquire meta information of the video contents stored in the server and then receive the streams of the video contents through the Ethernet. However, the communication channel capacity of the Ethernet may be insufficient for the bit rates of video contents. If several players have reproduced the streams of video contents through the Ethernet, the communication channel capacity of the Ethernet runs short. In this case, it takes time until the start of reproduction or video reproduction is interrupted.

If the connection between the server and the player over the HDMI can be detected, uncompressed videos can be transmitted and received more stably over the HDMI instead of the Ethernet. However, any means for detecting whether the devices on the Ethernet are connected to each other through the HDMI has not been known in the art.

(5) There is no means for detecting an HDMI/CEC physical address of a device recognized on the Ethernet. When an HDMI source device recognized on the Ethernet is connected to the sink device through the HDMI, there is no way to find the HDMI/CEC physical address of the source device, or to determine which the HDMI input terminal of the HDMI sink device is connected.

Therefore, the aforementioned points of concern have been desired to be solved.

According to a first embodiment of the invention, an electronic device includes: a response-request transmitting unit that transmits a response request including an identifier of the response-request transmitting unit on a second network to an external device through a first net work; and a response receiving unit that receives a response including an identifier of the external device on the first network, transmitted through the second network in response to the response request.

According to another embodiment of the present invention, an electronic device includes: a response-request receiving unit that receives a response request of an external device on the second network, transmitted from the external device through a first network; and a response transmitting unit transmitting a response including an own identifier on the first network to the external device through the second network in response to the response request received by the response-request receiving unit.

In any of these embodiments of the present invention, the response-request transmitting unit of the first electronic apparatus transmits a response request is transmitted to the external device (second electronic device) through the first network. This response request includes the identifier of the first electronic device on the second network. The response-request receiving unit of the second electronic device receives a response request transmitted from the external device (first electronic device).

Then, the response transmitting unit of the second electronic device transmits a response to the external device (first electronic device) through the second network, which is different from the above first network, in response to the response request received by the response-request receiving unit. This response includes the identifier of the second electronic device on the first network. The response receiving unit of the first electronic device receives the response transmitted from the external device (second electronic device) through the second network.

Therefore, the first electronic device transmits the second electronic device through the first network as long as it is connected to the second electronic device through the second network in addition to the connection on the first network. Thus, the first electronic device can be allowed to receive a response from the second electronic device through the second network. Since the response includes the identifier of the second electronic device on the first network, the first electronic device can find that the response is transmitted from the second electronic device to which the response request has been transmitted.

Therefore, this response allows the first electronic device to detect that it is also connected to the second electronic device through the second network and placed in a state of being communicatable with the second electronic device. In addition, the source address of the response allows the first electronic device to detect the identifier of the second electronic device on the second network.

For example, the first network may be an HDMI/CEC network and the second network may be an Ethernet network. In this case, the first electronic device can detect the identifier of the second electronic device on the Ethernet, such as the MAC address or the IP address thereof, to obtain the identifier specific to the device.

In any of the embodiments of the present invention, the first electronic device includes a contents data receiving unit that receives contents data from the external device (second electronic device) through the first network (HDMI/CEC network); and a contents information obtaining unit that obtains contents information from the external device (second electronic device) through the second network (Ethernet) in response to a response from the external device (second electronic device), received by the response receiving unit.

In this embodiment of the present invention, for example, the second electronic device may further include a contents data transmitting unit that transmits contents data to the external device (first electronic device) through the first network; and a contents information transmitting unit that transmits contents information to the external device (first electronic device) through the second network.

In this case, the first electronic device (HDMI sink device) can receive the contents data from the second electronic device (HDMI source device) through the HDMI/CEC network, while it can obtain contents information for qualifying contents, such as information about program names, recording time and date, channels, and performers, through the Ethernet.

In the embodiment of the present invention, for example, the first electronic device includes: a plurality of HDMI terminals; and a display control unit that displays the plurality of HDMI terminals and information corresponding to the identifier of the external device (second electronic device) connected to the HDMI terminal on the second network in response to the response from the external device (second electronic device), received by the response receiving unit.

In addition, the source address of the response allows the first electronic device to detect the identifier of the second electronic device (the identifier specific to the device) on the second network. Therefore, the electronic device can display a plurality of HDMI terminals together with the corresponding information, such as a device name, associated with the identifier of the external device (second electronic device) connected to each of the HDMI terminals on the Ethernet.

For example, the first network may be an Ethernet network and the second network may be an HDMI/CEC network.

In this embodiment of the present invention, for example, the first electronic device further includes: a first contents data receiving unit that receives contents data transmitted from the external device (second electronic device) through the first network (Ethernet); and a second contents data receiving unit that receives contents data from the external device (second electronic device) through the second network (HDMI/CEC network); and a transmission line switching control unit that changes a state of receiving the contents data on the first contents data receiving unit to a state of receiving the contents data on the second contents data receiving unit in response to the response from the external device (second electronic device), received by the response receiving unit.

In this embodiment of the present invention, for example, the second electronic device further includes: a first contents data transmitting unit that transmits contents data to the external device (first electronic device) through the first network; and a second contents data transmitting unit that transmits contents data to the external device (first electronic device) through the second network; and a transmission line switching control unit that changes a state of transmitting the contents data on the first contents data transmitting unit to a state of transmitting the contents data on the second contents data transmitting unit.

In this embodiment, when the first electronic device (HDMI sink device) is connected to the second electronic device (HDMI source device) not only through the Ethernet but also through the HDMI/CEC network, the first electronic device (HDMI sink device) can change a state of receiving contents data through the Ethernet to a state of receiving contents data through the HDMI/CEC network.

According to the first electronic device can transmits a response request to the second electronic device through the first network. The second electronic device transmits a response to the first electronic device through the second network in response to the response request from the first electronic device. The first electronic device is also connected to the second electronic device through the second network and can detect that it is in a state of being communicatable with the second network. Furthermore, the first electronic device can detect the identifier of the second electronic device on the second network.

BRIEF DESCRIPTION OF THE DRAWINGS

FIG. 7 is a diagram illustrating a pin arrangement (type A) of the HDMI terminal;

FIG. 11 is a diagram illustrating a configuration example of an Ethernet frame;

FIG. 12 is a diagram illustrating an example of a management information table including the management information associated with the IP address or MAC address of each device (source device) connected to the HDMI terminal of a TV receiver through an HDMI cable;

FIG. 17 is a block diagram illustrating a configuration example of an AV system according to a second embodiment of the present invention;

FIG. 18 is a block diagram illustrating a configuration example of a TV receiver (DMP device, sink device) in an AV system;

DESCRIPTION OF THE PREFERRED EMBODIMENTS

Preferred Embodiment of the Present Invention

Hereinafter, modes for carrying out the invention (hereinafter, referred to as "embodiments") will be described.

The embodiments will be described in the following order:
1. First embodiment;
2. Second embodiment; and
3. Modified embodiment.

1. First Embodiment

Configuration of an AV System

Figure 1:
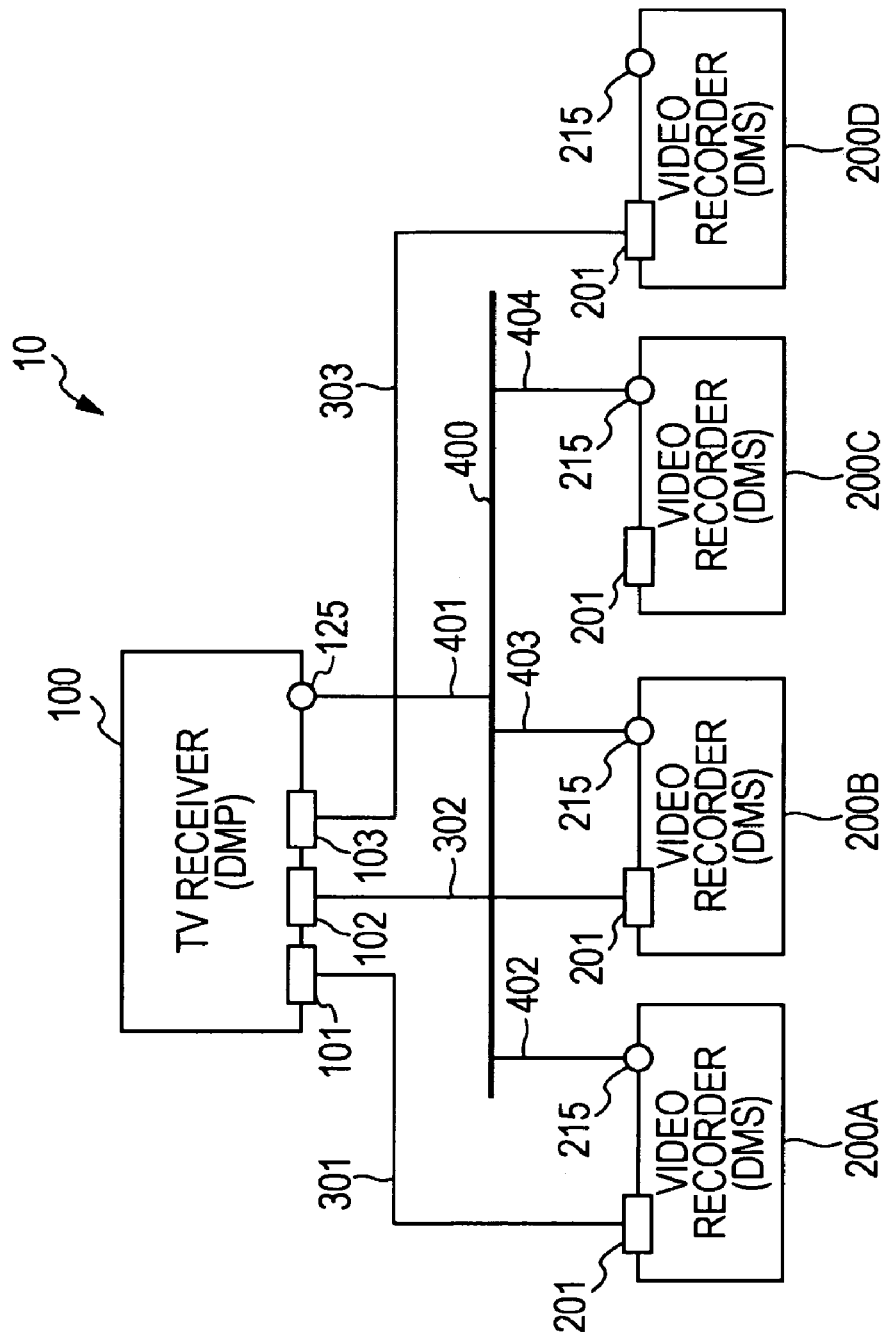
FIG. 1 is a block diagram illustrating a configuration example of an AV system according to a first embodiment of the present invention.

FIG. 1 shows a configuration example of an audio and visual (AV) system 10 as a first embodiment of the present invention. The AV system 10 includes a TV receiver 100 that serves as a contents-receiving device and video recorders 200A to 200D that serve as contents transmitter devices. Here, the TV receiver 100 has a DLNA client (DMP) function and serves as an HDMI sink device. In addition, each of the video recorders 200A to 200D includes a DLNA server (DMS) function and serves as an HDMI source device.

The TV receiver 100 includes three HDMI terminals (HDMI ports) 101 to 103 and one network terminal 125. In addition, each of the video recorders 200A to 200D includes one HDMI terminal (HDMI port) 201 and one network terminal 215. The HDMI terminals 101 to 103 and 201 are provided for connecting HDMI cables, respectively. The network terminals 125 and 215 are provided for connecting Ethernet cables, respectively.

The HDMI terminal 101 of the TV receiver 100 is connected to the HDMI terminal 201 of the video recorder 200A through an HDMI cable 301. The HDMI terminal 102 of the TV receiver 100 is connected to the HDMI terminal 201 of the video recorder 200B through an HDMI cable 302. The HDMI terminal 103 of the TV receiver 100 is connected to the HDMI terminal 201 of the video recorder 200D through an HDMI cable 303.

The network terminal 125 of the TV receiver 100 is connected to the Ethernet 400 through an Ethernet cable 401. The network terminal 215 of the video recorder 200A is connected to the Ethernet 400 through an Ethernet cable 402. The network terminal 215 of the video recorder 200B is connected to the Ethernet 400 through an Ethernet cable 402. The network terminal 215 of the video recorder 200C is connected to the Ethernet 400 through an Ethernet cable 404. Here, the HDMI cables 301 to 303 serve as TMDS transmission lines, while the Ethernet 400 serves as a DLNA transmission line.

[Configuration Example of TV Receiver]

Figure 2:
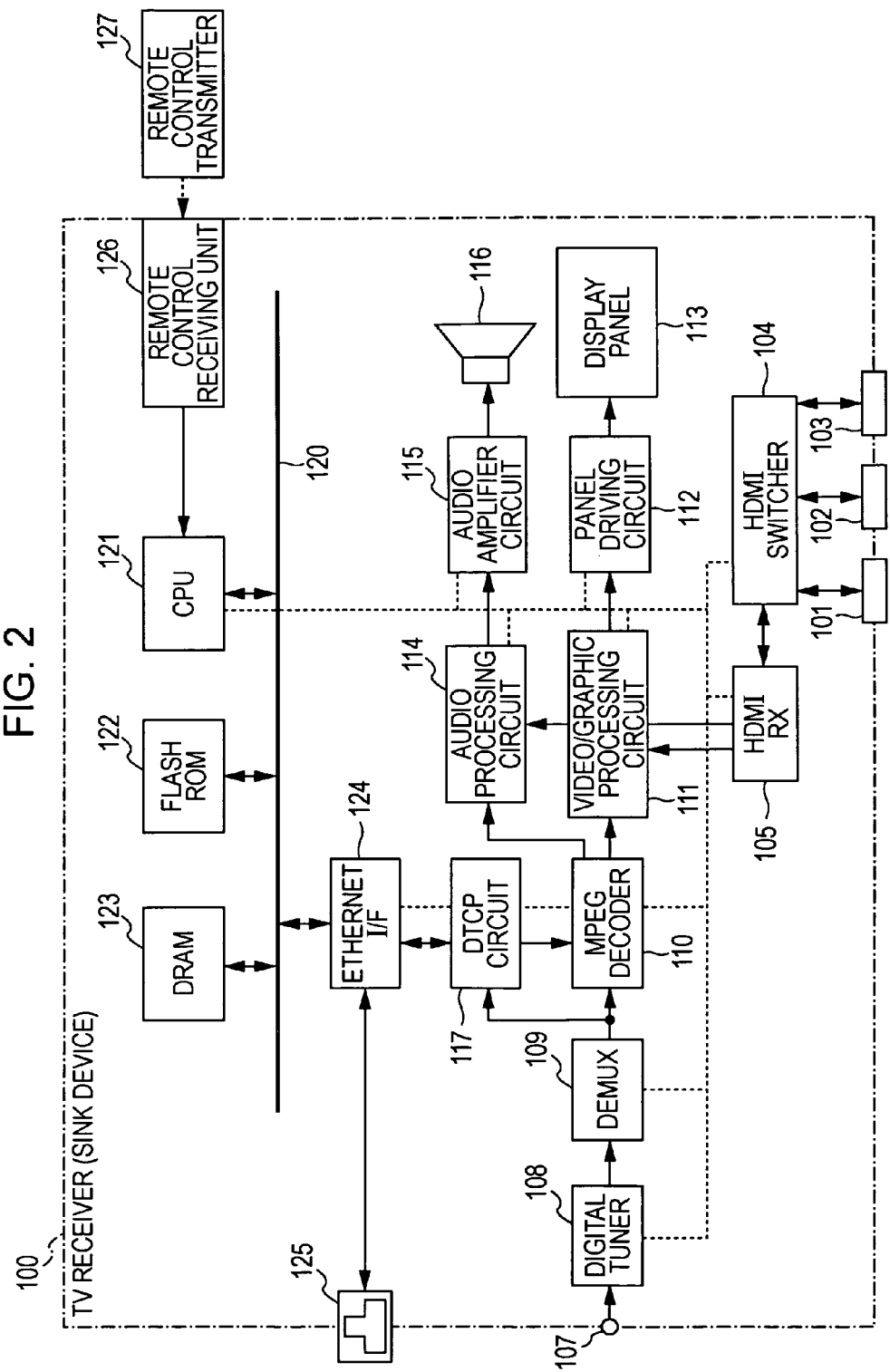
FIG. 2 is a block diagram illustrating a configuration example of a television (TV) receiver (DMP device, sink device) in the AV system.

FIG. 2 is a diagram illustrating the configuration of the TV receiver 100. The TV receiver 100 includes HDMI terminals 101 to 103, an HDMI switcher 104, and an HDMI receiving unit (HDMI RX) 105. In addition, the TV receiver 100 includes an antenna terminal 107, a digital tuner 108, a demultiplexer 109, and a MPEG (Moving Picture Expert Group) decoder 110.

The TV receiver 100 also includes a video/graphic processing circuit 111, a panel driving circuit 112, and a display panel 113. Furthermore, the TV receiver 100 includes an audio processing circuit 114, an audio amplifier circuit 115, a loudspeaker 116, and a DTCP (Digital Transmission Content Protection) circuit 117.

The TV receiver 100 further includes an internal bus 120, a CPU 121, a flash ROM 122, and a DRAM 123. The TV receiver 100 further includes an Ethernet interface (Ethernet I/F) 124, a network terminal 125, a remote-control receiving unit 126, and a remote control transmitter 127. Note that the term "Ethernet" is a registered trademark.

The antenna terminal 107 is provided for inputting a TV broadcasting signal received by a receiving antenna (not shown). The digital tuner 108 is provided for processing the TV broadcasting signal input through the antenna terminal 107 and then outputs a given transport stream corresponding to the channel selected by the user. The demultiplexer 109 extracts a partial transport stream (partial TS) corresponding to the channel selected by the user from the transport stream obtained from the digital tuner 108. The partial TS includes a TS packet of video data and a TS packet of audio data.

Furthermore, the demultiplexer 109 takes out PSI/SI (Program Specific Information/Service Information) from the transport stream obtained from the digital tuner 108 and then outputs the PSI/SI to a CPU 121. In the transport stream obtained from the digital tuner 108, a plurality of channels is multiplexed. The process of extracting the partial TS of an arbitrary channel from the transport stream by the demultiplexer 109 becomes possible by obtaining the information about the packet ID (PID) of this arbitrary channel from the transport stream.

The MPEG decoder 110 performs decoding of a video packetized elementary stream (video PES) formed with the TS packets of video data obtained from the demultiplexer 109 to obtain the video data. The MPEG decoder 110 also performs decoding of an audio PES packet formed with the TS packets of audio data obtained from the demultiplexer 109 to obtain the audio data. If desired, the MPEG decoder 110 performs decoding of the PES packets of video and audio data obtained by decoding in the DCP circuit 117 to obtain both the video data and the audio data.

If necessary, the video/graphic processing circuit 111 performs multi-screen processing, the superimposition of graphic data, or the like on the video data obtained by the MPEG decoder 110. The panel driving circuit 112 drives the display panel 113 based on the video data output from the video/graphic processing circuit 111. The display panel 113 may be, for example, a liquid crystal display (LCD) panel, a plasma display panel (PDP), or the like. The audio processing circuit 114 performs a desired process, such as D/A conversion, on the audio data obtained by the MPEG decoder 110. The audio amplifier circuit 115 amplifies an audio signal output from the audio processing circuit 114 and then supplies the amplified signal to a loudspeaker 116.

The DTCP circuit 117 enciphers a partial TS extracted by the demultiplexer 109 if desired. The DTCP circuit 117 decodes the encrypted data supplied from the network terminal 125 to the Ethernet interface (Ethernet I/F) 124.

The CPU 121 controls the operation of each part of the TV receiver 100. The flash ROM 122 stores control software and data. The DRAM 123 servers as a work area of the CPU 121.

The CPU 121 expands the software or data read out from the flash ROM 122 and then starts the software to control each part of the TV receiver 100.

The remote-control receiving unit 126 receives a remote control signal (remote control code) transmitted from the remote-control transmitter 127 and then supplies the control signal to the CPU 121. The CPU 121, the flash ROM 122, the DRAM 123, and the Ethernet interface 124 are connected to the internal bus 120.

The HDMI switcher 104 selectively connects the HDMI terminals 101 to 103 to the HDMI receiving unit (HDMI RX) 105, respectively. In other words, the HDMI receiving unit (HDMI RX) 105 is alternatively connected to any of the HDMI terminals 101 to 103 through the HDMI switcher 104. The HDMI receiving unit (HDMI RX) 105 performs HDMI communication to receive the video (image) and audio base band (uncompressed) data transmitted one-way from an external device (source device) connected to any of the HDMI terminals 101 to 103. The details of the HDMI receiving unit (HDMI RX) 105 will be described later.

The operation of the TV receiver 100 shown in FIG. 2 will be described. A TV broadcasting signal is input into the antenna terminal 107 and then supplied to the digital tuner 108. The digital tuner 108 processes the TV broadcasting signal and then outputs a given transport stream corresponding to the channel selected by the user. The transport stream is then supplied to the demultiplexer 109. The demultiplexer 109 extracts partial TS (TS packets of video data and TS packets of audio data) corresponding to the channel selected by the user from the transport stream and then supplies the partial TS to the MPEG decoder 110.

The MPEG decoder 110 performs a decoding process on a video PES packet formed with the TS packets of video data to obtain video data. The video data is subjected to multi-screen processing, the superimposition of graphic data, or the like if desired, and then supplies the video data to the panel driving circuit 112. Therefore, the display panel 113 can display an image corresponding to the channel selected by the user.

In addition, the MPEG decoder 110 decodes an audio PES packet formed with the TS packets of the audio data to obtain audio data. The audio data is subjected to the desired processing, such as D/A conversion, by the audio processing circuit 114 and then amplified by the audio amplifier circuit 115, followed by being supplied to the loudspeaker 116. Therefore, the loudspeaker 116 can output sounds corresponding to the channel selected by the user.

The partial TS extracted by the demultiplexer 109 can be transmitted to the network when receiving the aforementioned TV broadcasting signal. In this case, after the partial TS is encrypted by the DTCP circuit 117, the resultant partial TS is output to the network terminal 125 through the Ethernet interface 124. The encrypted partial TS, which has been supplied from the network terminal 125 to the Ethernet interface 124, is supplied to the MPEG decoder 110 after decryption by the DTCP circuit 117. Subsequently, the same operation as the aforementioned operation carried out at the time of receiving the TV broadcasting signal is performed. As a result, the display panel 113 displays images, while the loudspeaker 116 outputs sounds.

In addition, the HDMI receiving unit (HDMI RX) 105 obtains video (image) and sound data input into the HDMI terminals 101 to 103 through the respective HDMI cables. The video data is supplied to the video/graphic processing circuit 111, while the sound data is supplied to the audio processing circuit 114. Subsequently, the same operation as the aforementioned operation carried out at the time of receiving the TV broadcasting signal is performed. As a result, the display panel 113 displays images, while the loudspeaker outputs sounds.

[Configuration Example of Video Recorder]

Figure 3:
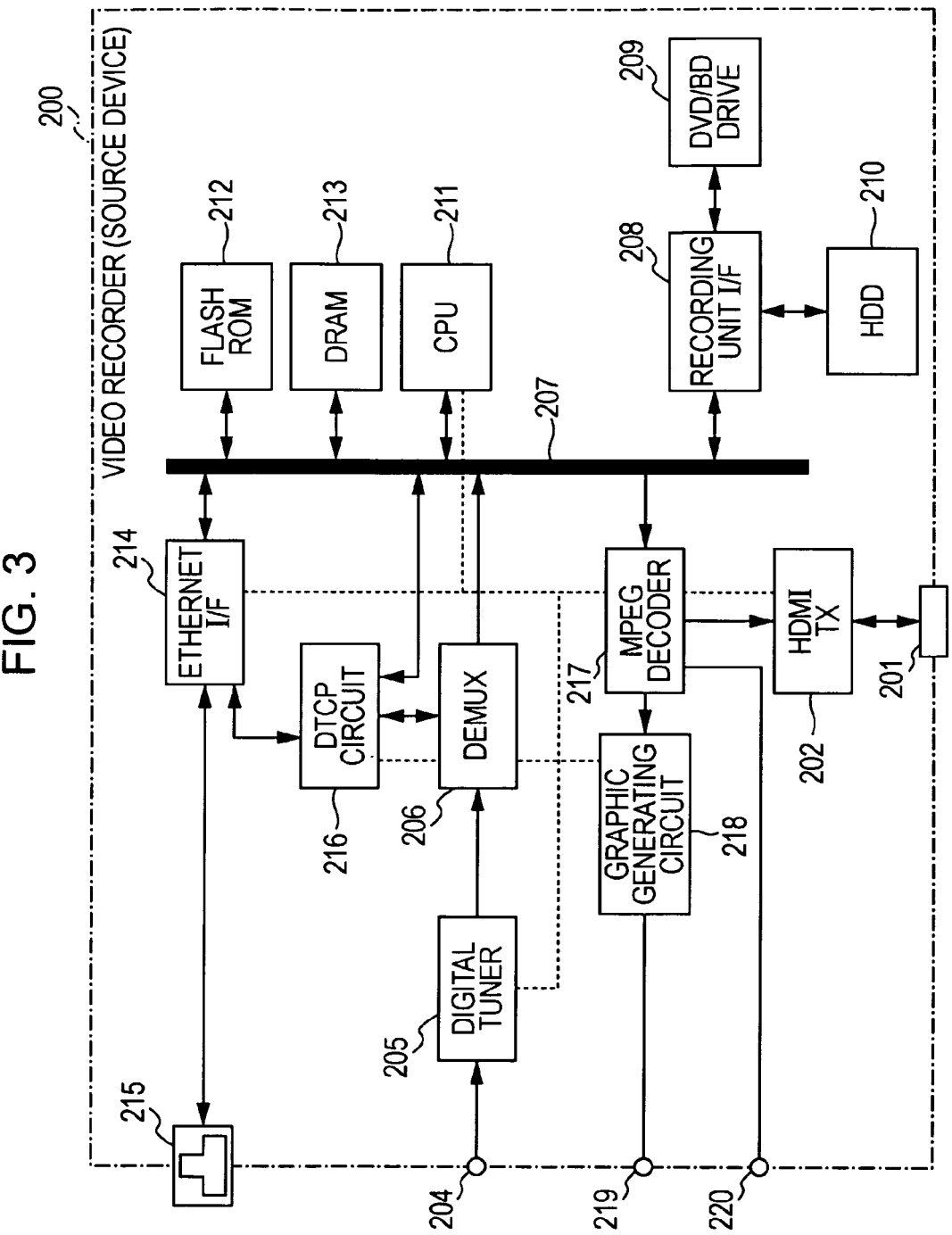
FIG. 3 is a block diagram illustrating a configuration example of a video recorder (DMP device, sink device) in the AV system.

FIG. 3 is a diagram illustrating an example of the configuration of a video recorder 200, which corresponds to each of video recorders 200A to 200D in FIG. 3. The video recorder 200 includes an HDMI terminal 201 and an HFMI transmitting unit (HDMI TX) 202. In addition, the video recorder 200 includes an antenna terminal 204, a digital tuner 205, a demultiplexer 206, and an internal bus 207. The video recorder 200 also includes a recording unit interface (I/F) 208, a digital versatile disc/Blu-Ray Disc (DVD/BD) drive 209, and a hard disk drive (HDD) 210.

In addition, the video recorder 200 includes a CPU 211, a flash ROM 212, a DRAM 213, an Ethernet interface (I/F) 214, a network terminal 215. Furthermore, the video recorder 200 includes a DTCP circuit 216, an MPEG decoder 217, a graphic generator circuit 218, a video output terminal 219, and an audio output terminal 220.

The HDMI transmitting unit (HDMI source) 202 performs HDMI-based communication to send out video (image) and audio baseband data from the HDMI terminal 201. The details of this HDMI transmitting unit (HDMI TX) 202 will be described later.

The antenna terminal 204 is provided for inputting a TV broadcasting signal received by a receiving antenna (not shown). The digital tuner 205 processes a television broadcasting signal input into the antenna terminal 204 and then outputs a given transport stream. A demultiplexer (Demux) 206 extracts a partial transport stream (partial TS) corresponding to a predetermined selection channel from a transport stream obtained by the digital tuner 205. The partial TS includes a TS packet of video data and a TS packet of audio data.

Furthermore, the demultiplexer (Demux) 206 takes out program specific information/service information (PSI/SI) from the transport stream obtained from the digital tuner 205 and then outputs the PSI/SI to a CPU 211. In the transport stream obtained from the digital tuner 205, a plurality of channels is multiplexed. The process of extracting the partial TS of an arbitrary channel from the transport stream by the demultiplexer (Demux) 206 becomes possible by obtaining the information about the packet ID (PID) of this arbitrary channel from the PSI/SI (PAT/PMT).

A CPU 211, a flash ROM 212, a DRAM 213, a demultiplexer (Demux) 206, an Ethernet interface 214, and a recording unit interface (I/F) 208 are connected to an internal bus 207. A DVD/BD drive 209 and a HDD 210 are connected to the internal bus 207 through the recording unit I/F 208. The DVD/BD drive 209 and the HDD 210 can record the partial TS extracted by the demultiplexer (Demux) 206. In addition, both the DVD/BD drive 209 and the HDD 210 can reproduce the partial TS recorded on the recording media mounted thereon, respectively.

The MPEG decoder 217 decodes a video PES packet in the partial TS extracted by the demultiplexer (Demux) 206 or reproduced by the DVD/BD drive 209 or the HDD 210 to obtain video data. In addition, the MPEG decoder 217 decodes the sound PES packet in the partial TS to obtain sound data.

A graphic generation circuit 218 performs any kind of processing, such as superimposition of graphic data, on the video data obtained by the MPEG decoder 217 if desired. A video output terminal 219 outputs vide data outputted from the graphic generation circuit 218. A sound output terminal 220 outputs sound data obtained by the MPEG decoder 217.

A DTCP circuit 216 encrypts the partial TS extracted by the demultiplexer (Demux) 206 or the partial TS regenerated from the DVD/BD drive 209 or the HDD 210 if desired. In addition, the DTCP circuit 206 decodes the encrypted data supplied from the network terminal 215 to an Ethernet interface (I/F) 214.

The CPU 211 controls the operation of each part of a video recorder 200. The flash ROM 212 stores control software and data. The DRAM 213 serves as a work area of the CPU 211. The CPU 211 expands the software or data read out from the flash ROM 212 onto the DRAM 213 and then starts the software to control each part of the disk recorder 200.

Here, the operation of the video recorder 200 shown in FIG. 3 will be described briefly. A TV broadcasting signal is input into the antenna terminal 204 and then supplied to the digital tuner 205. The digital tuner 205 takes out a given transport stream by processing a television broadcasting signal and then supplies the transport stream to the demultiplexer (Demux) 206. The demultiplexer 206 extracts partial TS (TS packets of video data and TS packets of audio data) corresponding to the given channel from the transport stream. The partial TS is supplied to the DVD/BD drive 209 or the HDD 210 through the recording unit I/F 208 and then recorded in response to the instruction of recording from the CPU 211. Furthermore, as described above, the partial TS extracted by the demultiplexer (Demux) 206 or the partial TS reproduced from the DVD/BD drive 209 or the HDD 210 is supplied to an MPEG decoder 217. The MPEG decoder 217 decodes the video PES packet formed with the TS packets of video data to obtain vide data. The video data is subjected to processing, such as superimposition of graphic data, in a graphic generation circuit 218 and then output to a video output terminal 219. In addition, the MPEG decoder 217 decodes an audio PES packet formed with the TS packets of the audio data to obtain audio data. Subsequently, the audio data is output to a sound output terminal 220.

The video (image) and sound data obtained by the MPEG decoder 217 corresponding to the partial TS reproduced from the DVD/VD drive 209 or the HDD 210 is supplied to the HDMI transmitting unit (HDMI TX) 202 and then sent out to an HDMI cable connected to an HDMI terminal 201.

The transmission of the partial TS extracted by the demultiplexer (Demux) 206 or the partial TS reproduced from the DVD/BD drive 209 or the HDD 210 is processed as follows:

The DTCP circuit 216 encrypts the partial TS and then outputs the encrypted partial TS to a network terminal 215 through the Ethernet interface (I/F) 214.

[Configuration Example of Each of HDMI Transmitting Unit (HDMI TX) and HDMI Receiving Unit (HDMI RX) in Combination]

Figure 4:
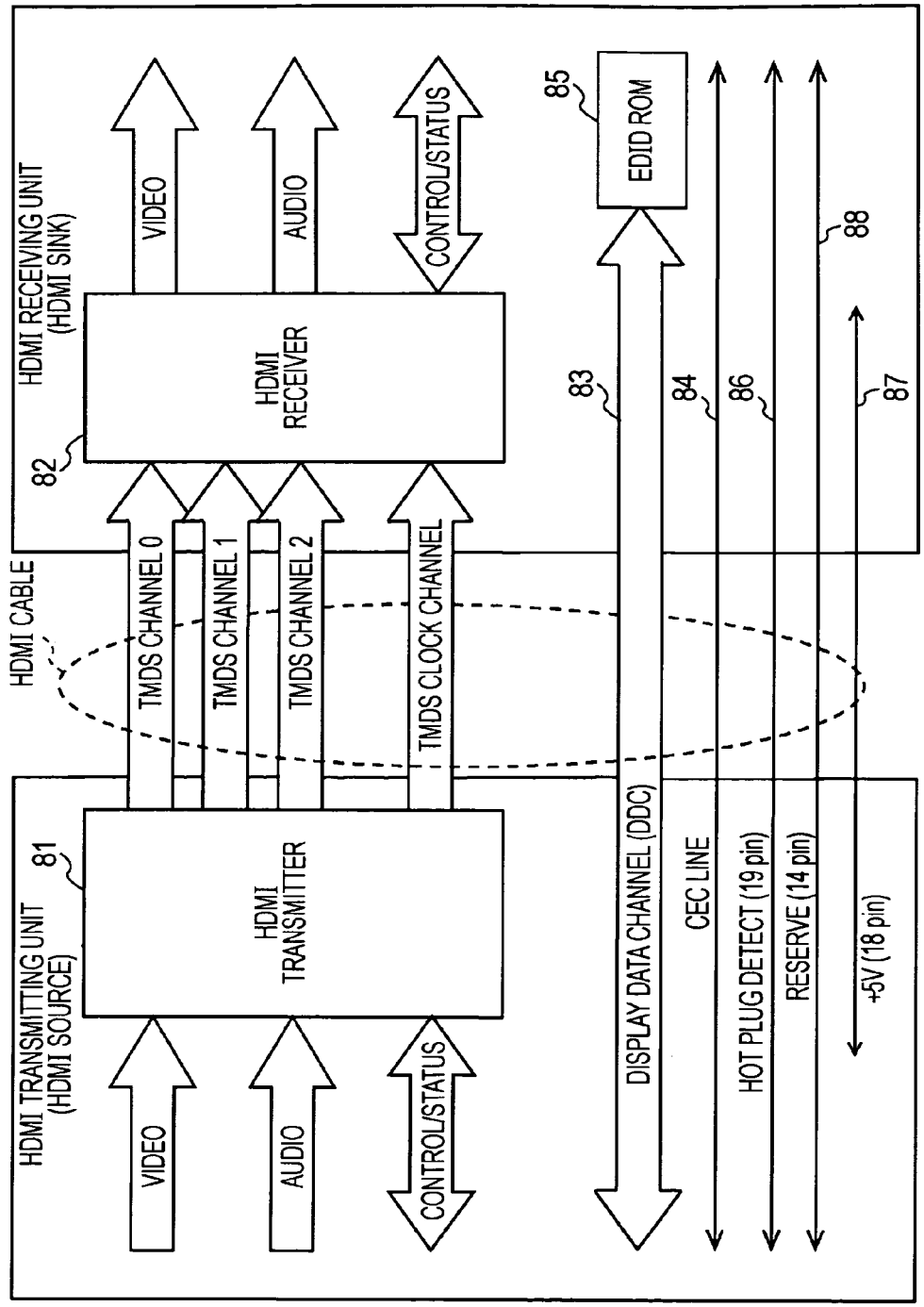
FIG. 4 is a block diagram illustrating a configuration example of a combination of an HDMI transmitting unit (HDMI source) and an EDMI receiving unit (HDMI sink)

FIG. 4 is a diagram illustrating the configuration example of each of an HDMI transmitting unit (HDMI TX) in a source device (video recorder 200) and the configuration example of an HDMI receiving unit (HDMI sink) in a sink device (TV receiver 100), which are arranged in combination.

The HDMI transmitting unit (HDMI source) unidirectionally transmits differential signals corresponding to uncompressed pixel data of an one-screen image to the HDMI receiving unit (HDMI sink) through a plurality of channels in an effective image period (hereinafter, also appropriately referred to as an "active video period"). Here, the term "effective image period" refers to a period from one vertical synchronizing signal to the next vertical synchronizing signal, excluding a horizontal blanking period and a vertical blanking period. Also, the HDMI transmitting unit unidirectionally transmits differential signals corresponding to at least audio data attached to the image, control data, and other auxiliary data to the HDMI receiving unit through a plurality of channels in the horizontal blanking period or the vertical blanking period. More specifically, the HDMI transmitting unit includes an HDMI transmitter 81. The HDMI transmitter 81 converts uncompressed pixel data of an image to a corresponding differential signals. Then, the HDMI transmitter 81 unidirectionally transmits the signals in serial to the HDMI receiving unit, which is connected to the HDMI transmitter 81 using the HDMI cable, through a plurality of channels, three TMDS channels #0, #1, and #2 in this example.

Also, the HDMI transmitter 81 converts audio data attached to the uncompressed image, desired control data, and other auxiliary data to the corresponding differential signals. Then, the HDMI transmitter 81 unidirectionally transmits the signals in serial to the HDMI receiving unit connected using the HDMI cable through the three TMDS channels #0, #1, and #2. Furthermore, the HDMI transmitter 81 transmits a pixel clock synchronized to the pixel data transmitted through the three TMDS channels #0, #1, and #2 to the HDMI receiving unit connected using the HDMI cable through a TMDS clock channel. Here, in each TMDS channel #i (i=0, 1, or 2), 10-bit pixel data is transmitted in one clock cycle of the pixel clock.

The HDMI receiving unit receives the differential signals corresponding to the pixel data unidirectionally transmitted from the HDMI transmitting unit through the plurality of channels in the active video period. Also, the HDMI receiving unit receives the differential signals corresponding to the audio data and control data unidirectionally transmitted from the HDMI transmitting unit through the plurality of channels in the horizontal blanking period of the vertical blanking period.

Specifically, the HDMI receiving unit includes an HDMI receiver 82. The HDMI receiver 82 receives the differential signals corresponding to the pixel data and the differential signals corresponding to the audio data and control data unidirectionally transmitted through the TMDS channels #0, #1, and #2 from the HDMI transmitting unit connected using the HDMI cable. In this case, in synchronization with the pixel clock transmitted from the HDMI transmitting unit using the TMDS clock channel, the HDMI receiver 82 receives the differential signals corresponding to the pixel data and the differential signals corresponding to the audio data and control data.

In addition to the aforementioned TMDS channels #0 to #2, the transmission lines of an HDMI system having the HDMI transmitting unit and the HDMI receiving unit further include a transmission lines called a display data channel (DDC) 83 and a CEC line 84. The CEC line 84 includes a signal line (not illustrated) included in the HDMI cable and is used for bidirectional communication of control data between the HDMI transmitting unit and the HDMI receiving unit. The DDC 83 includes two signal lines (not illustrated) included in the HDMI cable and is used by the HDMI transmitting unit to read E-EDID (Enhanced Extended Display Identification Data) from the HDMI receiving unit connected through the HDMI cable. In other words, the HDMI receiving unit includes, in addition to the HDMI receiver 82, an EDID read-only memory (EDID ROM) 85 that stores E-EDID, performance information about its performance (configuration/capability). The HDMI transmitting unit reads out the E-EDID of the HDMI receiving unit from the HDMI receiving unit connected using the HDMI cable through the DDC 83. Then, the HDMI transmitting unit recognizes the format (profile) of images compatible with an electronic device including the HDMI receiving unit, for example RGB, YCbCr 4:4:4, or YCbCr 4:2:2, on the basis of the E-EDID.

The HDMI cable includes a line 86 connected to a pin called HPD (Hot Plug Detect). The source device can detect connection of the sink device using the line 86. Also, the HDMI cable includes a line 87 used to supply power from the source device to the sink device. Furthermore, the HDMI cable includes a reserve line 88.

Figure 5:
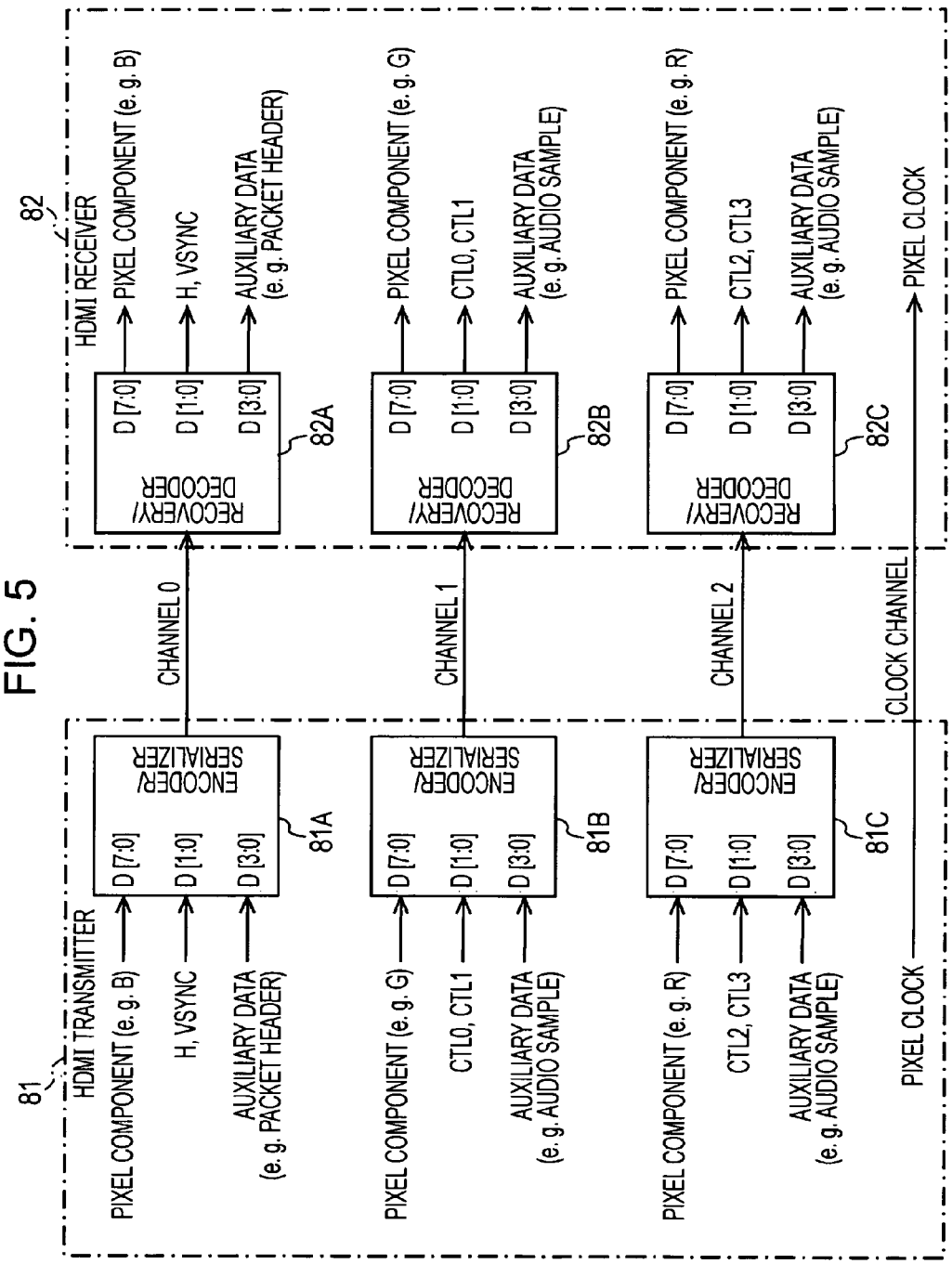
FIG. 5 is a block diagram illustrating a configuration example of a combination of an HDMI transmitter and an HDMI receiver.

FIG. 5 is a diagram illustrating the configuration example of each of the HDMI transmitter 81 and the HDMI receiver 82 shown in FIG. 4.

The HDMI transmitter 81 includes three encoders/serializers 81A, 81B, and 81C corresponding to the three TMDS channels #0, #1, and #2, respectively. The respective encoders/serializers 81A, 81B, and 81C encode image data, auxiliary data, and control data supplied thereto, convert parallel data to serial data, and transmit the serial data by using differential signals. Now, assume that the image data has three components of red (R), green (G), and blue (B). In this case, the B component is supplied to the encoder/serializer 81A, the G component is supplied to the encoder/serializer 81B, and the R component is supplied to the encoder/serializer 81C.

In addition, the auxiliary data includes audio data and a control packet. For example, the control packet is supplied to the encoder/serializer 81A and the audio data is supplied to the encoders/serializers 81B and 81C, for example. Furthermore, the control data includes a 1-bit vertical synchronizing signal (VSYNC), a 1-bit horizontal synchronizing signal (HSYNC), and control bits CTL0, CTL1, CTL2, and CTL3 each having 1 bit. The vertical and horizontal synchronizing signals are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the B component of image data, the vertical and horizontal synchronizing signals, and the auxiliary data, which are supplied to the encoder/serializer 81A, in time-sharing mode. That is, the encoder/serializer 81A converts the B component of image data supplied thereto to parallel data in units of predetermined bits, 8 bits. Furthermore, the encoder/serializer 81A encodes the parallel data, converts the parallel data to serial data, and transmits the serial data through the TMDS channel #0.

Also, the encoder/serializer 81A encodes 2-bit parallel data of the vertical and horizontal synchronizing signals supplied thereto. Subsequently, the encoder/serializer 81A converts the parallel data to serial data and then transmits the serial data through the TMDS channel #0. Furthermore, the encoder/serializer 81A converts the auxiliary data supplied thereto to parallel data in units of 4 bits. Subsequently, the encoder/serializer 81A encodes the parallel data, converts the parallel data to serial data, and transmits the serial data through the TMDS channel #0.

The encoder/serializer 81B transmits the G component of image data, the control bits CTL0 and CTL1, and the auxiliary data, which are supplied to the encoder/serializer 81B, in time-sharing mode. That is, the encoder/serializer 81B converts G component of image data supplied thereto to parallel data in units of 8 bits of a fixed bit number. Furthermore, the encoder/serializer 81B encodes the parallel data, converts the parallel data to serial data, and transmits the serial data through the TMDS channel #1.

Also, the encoder/serializer 81B encodes 2-bit parallel data of the control bits CTL0 and CTL1 supplied thereto, converts the parallel data to serial data, and transmits the serial data through the TMDS channel #1. Furthermore, the encoder/serializer 81B converts the auxiliary data supplied thereto to parallel data in units of 4 bits. Then, the encoder/serializer 81B encodes the parallel data, converts the parallel data to serial data, and transmits the serial data through the TMDS channel #1.

The encoder/serializer 81C transmits R component of image data, control bits CTL2 and CTL3, and auxiliary data, which are supplied to the encoder/serializer 81C, in time-dividing mode. That is, the encoder/serializer 81C converts R component of image data supplied thereto to parallel data in units of 8 bits of a fixed bit number. Furthermore, the encoder/serializer 81C encodes the parallel data, converts the parallel data to serial data, and transmits the serial data through the TMDS channel #2. Also, the encoder/serializer 81C encodes 2-bit parallel data of the control bits CTL2 and CTL3 supplied thereto, converts the parallel data to serial data, and transmits the serial data through the TMDS channel #2. Furthermore, the encoder/serializer 81C converts the auxiliary data supplied thereto to parallel data in units of 4 bits. Then, the encoder/serializer 81C encodes the parallel data, converts the parallel data to serial data, and transmits the serial data through the TMDS channel #2.

The HDMI receiver 82 includes three recovery/decoders 82A, 82B, and 82C corresponding to the three TMDS channels #0, #1, and #2. The respective recovery/decoders 82A, 82B, and 82C receive image data, auxiliary data, and control data transmitted by differential signals through the TMDS channels #0, #1, and #2. Furthermore, the respective recovery/decoders 82A, 82B, and 82C convert the image data, auxiliary data, and control data from serial data to parallel data, decode the parallel data, and output the parallel data. In other words, the recovery/decoder 82A receives the B component of image data, the vertical and horizontal synchronization signals, and the auxiliary data transmitted by differential signals through the TMDS channel #0. Then, the recovery/decoder 82A converts the B component of image data, the vertical and horizontal synchronizing signals, and the auxiliary data from serial data to parallel data, decodes the parallel data, and outputs the parallel data. The recovery/decoder 82B receives G component of image data, control bits CTL0 and CTL1, and auxiliary data transmitted by differential signals through the TMDS channel #1. Then, the recovery/decoder 82B converts the G component of image data, the control bits CTL0 and CTL1, and the auxiliary data from serial data to parallel data, decodes the parallel data, and outputs the parallel data.

The recovery/decoder 82C receives R component of image data, control bits CTL2 and CTL3, and auxiliary data transmitted by differential signals through the TMDS channel #2. Then, the recovery/decoder 82C converts the R component of image data, the control bits CTL2 and CTL3, and the auxiliary data from serial data to parallel data, decodes the parallel data, and outputs the parallel data.

Figure 6:
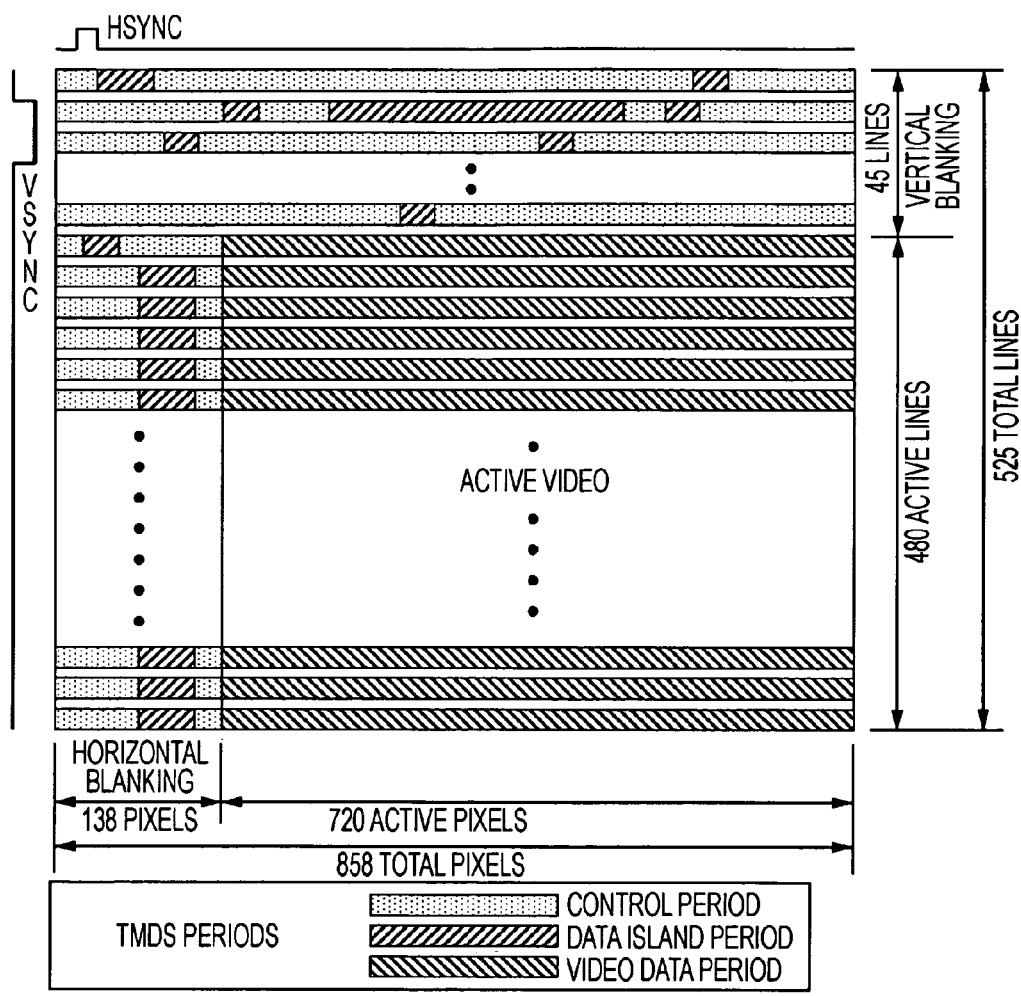
FIG. 6 is a diagram illustrating an example of a TMDS transmission data structure.

FIG. 6 illustrates an example of transmission periods in which various pieces of transmission data are transmitted through the three TMDS channels #0, #1, and #2 of HDMI. FIG. 6 illustrates the periods of respective pieces of transmission data in the case where progressive images of horizontal 720×vertical 480 pixels are transmitted through the TMDS channels #0, #1, and #2.

In a video field where transmission data is transmitted through the three TMDS channels #0, #1, and #2 of HDMI, three types of periods exist according to the types of transmission data: a video data period, a data island period, and a control period. Here, the term "video filed period" refers to a period from the active edge of one vertical synchronizing signal to the active edge of the next vertical synchronizing signal. The video field period can be divided into a horizontal blanking period, a vertical blanking period, and an active video period. The active video period is a video filed period except the horizontal blanking period and the vertical blanking period.

The video data period is assigned to the active video period. In the video data period, data of active pixels corresponding to 720 pixels×480 lines constituting uncompressed image data of one screen is transmitted. The data island period and the control period are assigned to the horizontal blanking period and the vertical blanking period. In the data island period and the control period, auxiliary data is transmitted.

Specifically, the data island period is assigned to part of the horizontal blanking period and the vertical blanking period. In the data island period, data unrelated to control in the auxiliary data, for example, packets of audio data, are transmitted. The control period is assigned to the other part of the horizontal blanking period and the vertical blanking period. In the control period, data related to control in the auxiliary data, such as vertical synchronizing signals, horizontal synchronizing signals, and control packets, are transmitted. In the current HDMI, the frequency of a pixel clock transmitted through the TMDS clock channel is 165 MHz, for example. In this case, the transmission rate in the data island period is about 500 Mbps.

FIG. 7 illustrates a pin array of HDMI terminals. This pin array is an example of type A. Two lines through which differential signals TMDS Data #i+ and TMDS Data #i− of the TMDS channel #i are transmitted connect to the pins to which TMDS Data #i+ is assigned and the pins to which TMDS Data #i− is assigned, respectively.

The CEC line 84 through which a CEC signal as controlling data is transmitted connects to the pin having a pin number 13. The pin having the pin number 14 is reserved. The line through which an SDA (serial data) signal such as E-EDID is transmitted connects to the pin having the pin number 16. The line through which an SCL (serial clock) signal as a clock signal used for synchronization at transmission/reception of an SDA signal connects to the pin having the pin number 15. The above-described DDC 83 includes the line through which the SDA signal is transmitted and the line through which the SCL signal is transmitted. As described above, the line 86 used by a source device to detect connection of a sink device connects to the pin having the pin number 19. Also, as described above, the line 87 to supply power connects to the pin having the pin number 18.

[Response Request and Response]

In the AV system 10 shown in FIG. 1, the TV receiver 100 is connected to the video recorders 200A, 200B, and 200D through the HDMI cables 301, 302, and 303, respectively. Therefore, the TV receiver 100A can receive uncompressed contents data (image data and sound data) from the video recorders 200A, 200B, and 200D through the HDMI cables 301, 302, and 303, respectively. In this case, the TV receiver 100 functions as a sink device of HDMI, and VCRs 200A, 200B, and 200D function as source device of HDMI.

In addition, the TV receiver 100 increases the video recorders 200A, 200B, and 200C through the Ethernet 400. Therefore, the TV receiver 100 can receive content data (image data and sound data) from the video recorders 200A, 200B, and 200C through the Ethernet 400, respectively. In this case, the TV receiver 100 functions as a client (DMP) of DLNA, and the video records 200A, 200B, and 200C function as servers (DMSs) of DLNA.

In the AV system 10 shown in FIG. 1, the TV receiver 100 includes the HDMI terminals 101, 102, and 103 connecting to the HDMI cables 301, 302, and 303 through the video recorders 200A, 200B, and 200D, respectively. Therefore, if the user selects the category of "external input", then the display panel 113 displays the HDMI port numbers, "HDMI 1", "HDMI 2", and "HDMI 3", corresponding to the HDMI terminals 101, 102, and 103, respectively. Any of the HDMI port numbers, "HDMI 1", "HDMI 2", and "HDMI 3", represented as shown in FIG. 1 can be selected by the user's operation to bring the TV receiver 100 into an external input state for receiving contents data through the corresponding HDMI cable.

The TV receiver 100 can detect whether it can connect to the video recorders 200 through the Ethernet while the video recorders 200 are connected to the respective HDMI terminals and are in a state of being communicatable. In addition, the TV receiver 100 can detect the identifier (for example, MAC address) of the video recorder on the Ethernet, where the video recorder is being connected to the Ethernet.

In this case, the TV receiver 100 transmits a response request to the video recorders 200 connected to the respective HDMI terminals through the HDMI/CEC network. The response request includes the identifier of the TV receiver 100, such as an IP address or a MAC address, on the Ethernet 400. This identifier is used as the response destination.

Figure 8:
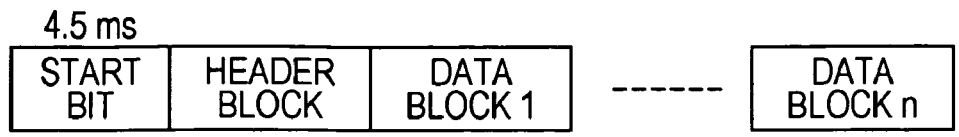
FIG. 8 is a diagram illustrating the data structure of CEC.
Figure 9:
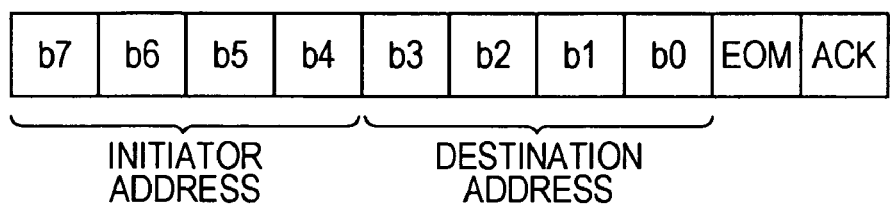
FIG. 9 is a diagram illustrating the data structure of the header block of CEC.

FIG. 8 illustrates a block structure of data transmitted through the CEC line (CEC channel). In the CEC line, one block is transmitted in 4.5 milliseconds. At start of data transmission, a start bit is placed, a header block is placed, and then an arbitrary number (n) of data blocks including data to be actually transmitted are placed. FIG. 9 illustrates an example of data structure of the header block. In the header block, a logical address of the initiator and a logical address of the destination are placed. These addresses can be determined depending on the types of the respective devices.

Here, any of the video recorders 200 obtains its physical address from the TV receiver 100 using a HDMI control protocol when it is connected to the TV receiver through the HDMI cable. In addition, The CEC-compatible device is specified to obtain a logical address at HDMI connection. The CEC-compatible device transmits/receives a message using the logical address.

Figure 10:
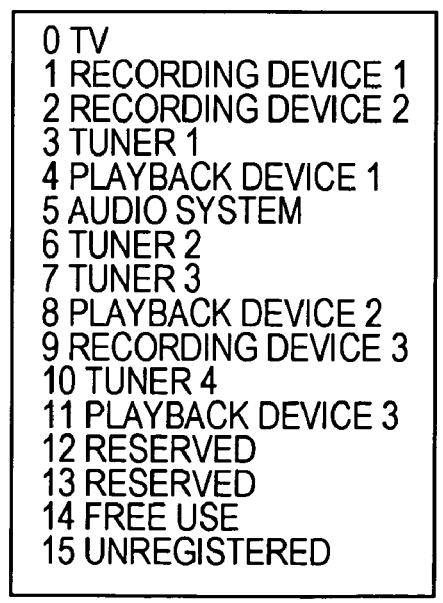
FIG. 10 is a diagram illustrating an example of a logic address which is determined according to the type of each device.

FIG. 10 illustrates a table showing the correspondence between devices and CEC logical addresses. In the table, "TV" in the device field includes a television set, a projector, and the like. "Recording Device" in the device field includes a BD recorder, a HDD recorder, and the like. "Tuner" in the device field includes an STB (Set Top Box) and the like. "Playback Device" in the device field includes a DVD player, a camcoder, and the like. "Audio System" in the device field includes an AV amplifier and the like. As is evident from the CEC table, the number of the devices which can be simultaneously connected is previously determined. When the devices more than the specified number thereof are connected, the logic addresses of these devices are {15}.

Since the video recorder 200 itself is a recording device, the video recorder 200 selects a logic address as a recording device for the CEC control device based on the CEC table shown in FIG. 10. Then, the video recorder 200 confirms that there is no other device having the same logic address as that of the video recorder 200 by a polling message of the CEC-control protocol, followed by determining the logical address as its own logic address. Then, the video recorder 200 notifies the TV receiver 100 that its own physical address corresponds to the determined physical address using a report physical address of the CEC control protocol. In addition, the video recorder 200, which has received the above response request from the TV receiver 100, transmits a response to the TV receiver 100 through the Ethernet 400 in response to the response request. The response includes the identifier of the respective video recorder 200, such as a CEC physical address or a CEC logic address, on the HDMI/CEC network.

FIG. 11 is a diagram illustrating the configuration example of an Ethernet frame (DIX specification). The Ethernet frame is set after transmission of a preamble with a bit pattern of 8 bytes. The Ethernet frame includes an Ethernet header, data, and FCS. The Ethernet header is a byte length of 14 bytes, including a 6-byte destination MAC address, a 6-byte source MAC address, and a 2-bypte Ethertype field. The Ethertype represents the packet of the upper layer protocol included in the data block.

The TV receiver 100 (CPU 121) previously obtains the MAC address of a DLNA device (video recorder 200) connected through the Ethernet 400 by the following process.

That is, the TV receiver 100 and the video recorder 200 which participate in the network perform the address setting at the beginning. The user may perform the address setting by manually assigning a static IP address. Alternatively, since the device is the DLNA device, it may be assigned with an auto IP or may be assigned with an IP address by the DHCP client.

Next, for example, the TV receiver 100 and the video recorder 200 perform the discovery of a DLNA device connected to the network by the process of discovering a universal plug and play (UPnP) device. The device discovery process is performed using a protocol called a simple service discovery protocol (SSDP) as is commonly known in the art.

Then, the TV receiver 100 obtains the MAC Address of the video recorder 200 connected through the Ethernet 400. The TV receiver 100 make an inquiry using the Ethernet stream where the broadcast address is used as a destination MAC address to search the video recorder 200 (device name, specified by the IP address) discovered by the above-described UPnP device discovery.

In response to the inquiry, the video recorder 200 detected by the above described UPnP device discovery uses the MAC address of the TV receiver 100 as a destination address and transmits an Ethernet frame using its own MAC address as a source address as a search response. The TV receiver 100 can find the MAC address of the video recorder 200 by a search response from the video recorder 200.

The TV receiver 100 (CPU 121) obtains the MAC address of the video recorder 200 as described above. Subsequently, as shown in FIG. 12, the DLNA device name, IP address, and MAC address of the video recorder 200 are brought into correspondence to one another. In FIG. 12, for example, the video recorders 200A, 200B, and 200C are provided with their respective DLNA device names, "Video ABCD", "AABD Video", and "Video 1234".

As described above, a response request including the identifier of the TV receiver 100 on the Ethernet 400 is transmitted to the video recorder 200 connected to each of the HDMI terminals from the TV receiver 100 through the HDMI/CEC network. Subsequently, to the TV receiver 100 from the video recorder 200 that has received the response request, a response including the identifier of the video recorder 200 on the HDMI/CEC network is transmitted through the Ethernet 400.

Therefore, the TV receiver 100 can receive the response from the video recorder 200 through the Ethernet 400 by transmitting the response request through CEV as long as the video recorder 200 is connected to each of the HDMI terminals. Since the response includes the identifier of the video recorder 200 on the HDMI/CEC network, the TV receiver 100 can this response is one from the video recorder that has transmitted the response request.

Therefore, the TV receiver 100 can detect that the TV receiver 100 is also connected to the video recorder 200 through the Ethernet 400 and is in a state of being communicatable therewith. In addition, the TV receiver 100 can detect the identifier of the video recorder 200 on the Ethernet 400 with reference to the source address of the response. Since the identifier on this Ethernet 400 is one unique to the device, the TV receiver 100 can specify the video recorder 200 with respect to the response.

Figure 13:
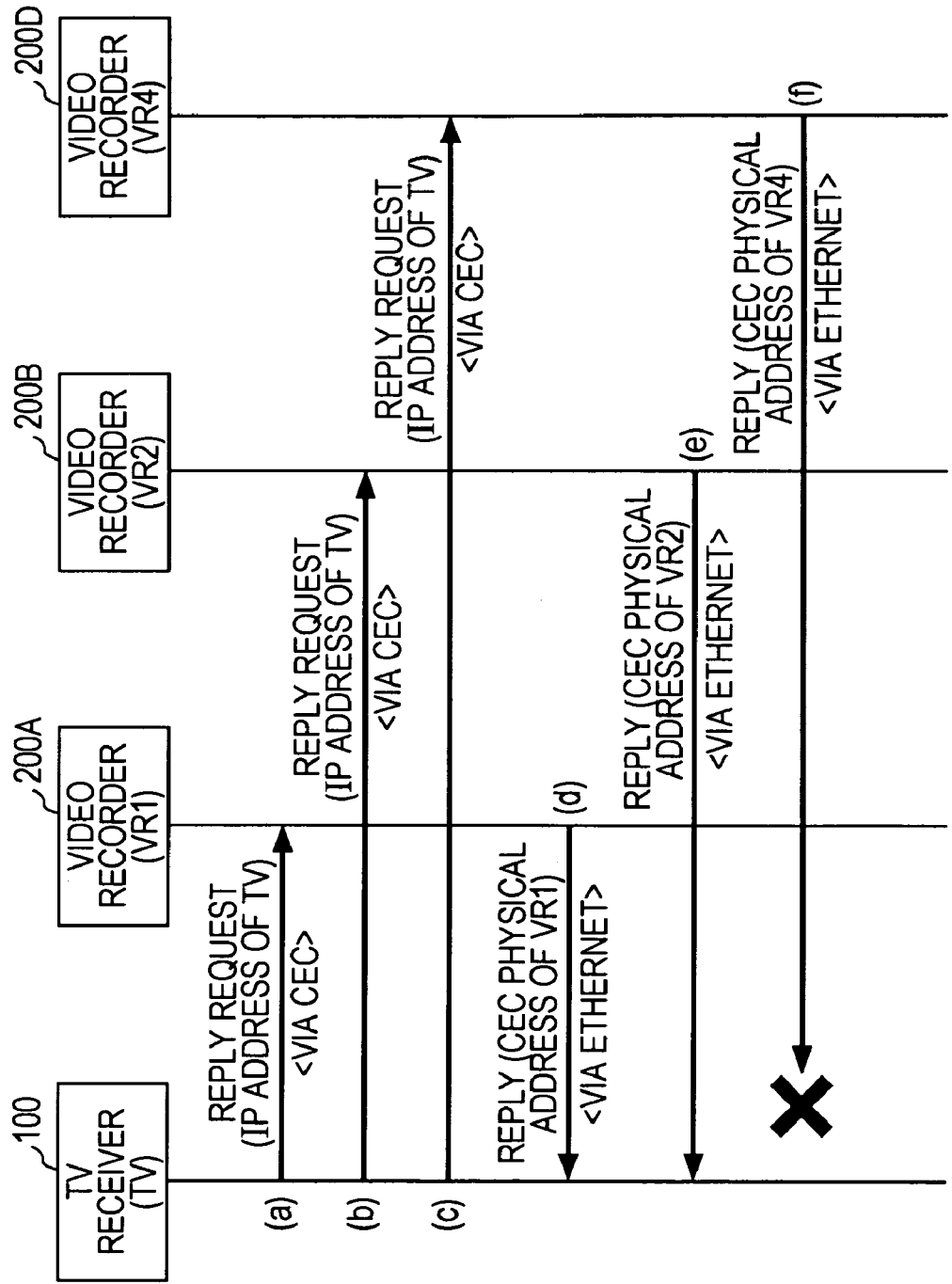
FIG. 13 is a diagram illustrating an example of a communication sequence including a response request from a TV receiver to each of video recorders through CEC and a response from each video recorder to the TV receiver.

FIG. 13 is a diagram illustrating an example of a communication sequence for the response request from the TV receiver 100 to each of the video recorders 200A, 200B, and 200D and the response request from each of the video recorders 200A, 200B, and 200D to the TV receiver 100.

(a) The TV receiver (TV) 100 transmits a response request to the video recorder (VR1) 200A connected to the HDMI terminal 101 through the HDMI/CEC network. This response request includes the identifier of the TV receiver 100, such as the IP address thereof, on the Ethernet 400.

(b) In addition, the TV receiver 100 transmits a response request to the video recorder (VR2) 200B connected to the HDMI terminal 102 through the HDMI/CEC network. This response request includes the identifier of the TV receiver 100, such as the IP address thereof, on the Ethernet 400.

(c) In addition, the TV receiver 100 transmits a response request to the video recorder (VR4) 200D connected to the HDMI terminal 102 through the HDMI/CEC network. This response request includes the identifier of the TV receiver 100, such as the IP address thereof, on the Ethernet 400.

(d) The video recorder (VR1) 200A transmits a response to the TV receiver 100 through the Ethernet 400. This response includes, for example, a CEC physical address which is the identifier of the video recorder (VR1) 200A on the HDMI/CEC network. In addition, the TV receiver 100 can receive the response because of being connected to the video recorder (VR1) 200A through the Ethernet.

Therefore, the TV receiver 100 can detect that it is also connected to the video recorder (VR1) 200A, which has been connected to the HDMI terminal 101, through the Ethernet. In addition, the TV receiver 100 can detect the identifier of the video recorder (VR1) 200A on the Ethernet 400 with reference to the source address (MAC address) of the response.

(e) The video recorder (VR2) 200B transmits a response to the TV receiver 100 through the Ethernet 400. This response includes, for example, a CEC physical address which is the identifier of the video recorder (VR2) 200B on the HDMI/CEC network. In addition, the TV receiver 100 can receive the response because of being connected to the video recorder (VR2) 200B through the Ethernet.

Therefore, the TV receiver 100 can detect that it is also connected to the video recorder (VR2) 200B, which has been connected to the HDMI terminal 102, through the Ethernet 400. In addition, the TV receiver 100 can detect the identifier of the video recorder (VR2) 200B on the Ethernet 400 with reference to the source address (MAC address) of the response.

(f) The video recorder (VR4) 200D transmits a response to the TV receiver 100 through the Ethernet 400. This response includes, for example, a CEC physical address which is the identifier of the video recorder (VR4) 200D on the HDMI/CEC network. In addition, the TV receiver 100 does not receive the response because of being unconnected to the video recorder (VR4) 200D through the Ethernet. The TV receiver 100 does not receive any response from the video recorder (VR4) 200D, so that it can be recognized that the video recorder (VR4) 200D is not connected to the Ethernet 400 or is connected thereto in an out-of-communication state.

The TV receiver 100 can obtain various kinds of information through the Ethernet 400 when the TV receiver 100 is connected to the video recorders 200 connected to the respective HDMI terminals. For example, the TV receiver 100 can obtain information for qualifying contents, such as information about program names, recording time and date, channels, and performers, held in the video recorders 200 connected to the respective HDMI terminals. Furthermore, for example, the TV receiver 100 can obtain information about the model numbers and manufacture names of the video recorders 200 connected to the respective HDMI terminals, and the name of a device (DLNA device name) which is arbitrarily mounted by the user.

Furthermore, as described above, the TV receiver 100 can detect the identifiers of the video recorders 200 connected to the respective HDMI terminals on the Ethernet 400. Therefore, the TV receiver 100 can display each of the HDMI terminals together with the corresponding information, such as a device name, associated with the identifier of the video recorder 200 connected to the HDMI terminal on the Ethernet 400.

Figure 14:
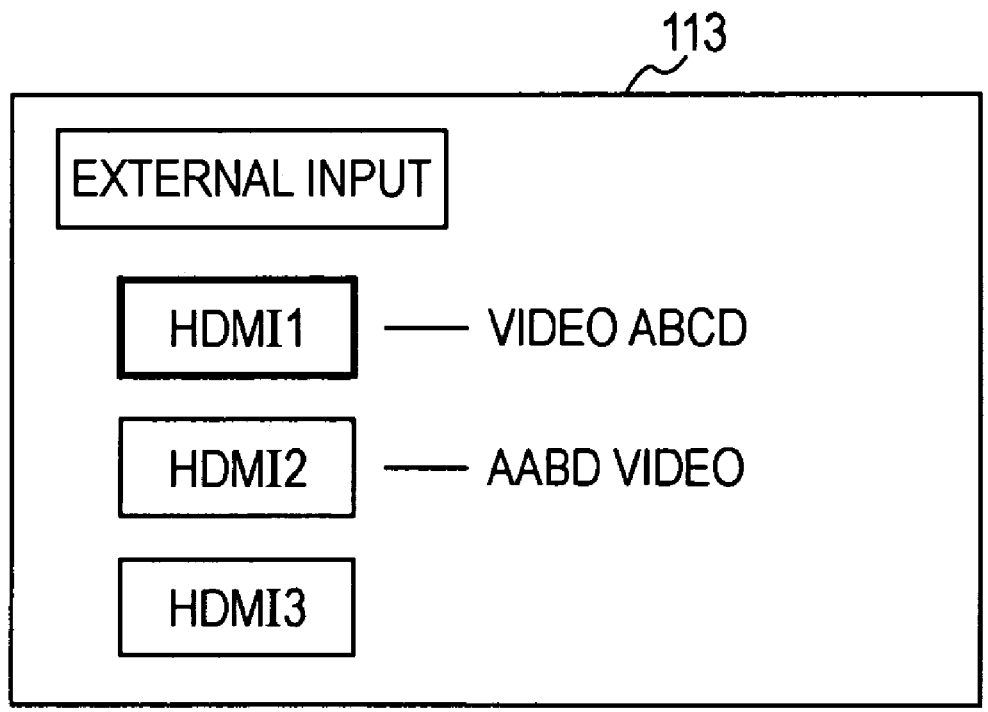
FIG. 14 is a diagram illustrating a display example of a display panel of a TV receiver when the user selects the category "external input"

FIG. 14 illustrates an example of the display on a display panel 113 when the user selects, for example, the category "external input". In this example, the display panel 113 displays HDMI port numbers, "HDMI 1", "HDMI 2", and "HDMI 3", which correspond to the HDMI terminals 101, 102, and 103, respectively. In this example, the display panel 113 also displays DLNA device names, "Video ABC", and "AABD Video" corresponding to the HDMI port numbers, "HDMI 1" and "HDMI 2" associated with the HDMI terminals 101 and 102, respectively.

The network terminal 125 of the TV receiver 100 is connected to each of the video recorders 200A, 200B, and 200C through the Ethernet 400. Therefore, for example, when the user selects the category "network", the display panel 113 displays the device names (DLNA device names) corresponding to the video recorders 200A, 200B, and 200C. By selecting any of the device names displayed on the display panel 113 in this way, the TV receiver 100 can be functioned as a DLNA client and comes into the state of receiving contents data through the Ethernet 400.

The TV receiver 100 can detect whether it can connect to the video recorders 200 through the Ethernet 400 while the video recorders 200 are connected to the-HDMI/CEC network. In addition, the TV receiver 100 can detect the identifier (for example, CEC physical address) of the video recorder on the Ethernet, where the video recorder is being connected to the HDMI/CEC network.

In this case, the TV receiver 100 transmits a response request to the video recorder 200, which is being connected through the Ethernet 400, through the Ethernet 400. The response request includes the identifier of the TV receiver 100, such as a CEC physical address or a CEC logic address, on the HDMI/CEC network. This identifier is used as the response destination.

In addition, the video recorder 200, which has received the above response request from the TV receiver 100, transmits a response to the TV receiver 100 through the HDMI/CEC network, in response to the response request. The response includes the identifier of the video recorder 200, such as an IP address or a MAC address, on the Ethernet 400.

As described above, the video recorder 200 is connected to the TV receiver 100 through the Ethernet 400. Thus, a response request including the identifier of the TV receiver 100 on the HDMI/CEC network is transmitted from the TV receiver 100 to the video recorder 200 through the Ethernet 400. Subsequently, to the TV receiver 100 from the video recorder that has received the response request, a response including the identifier of the video recorder 200 on the Ethernet 400 is transmitted through the HDMI/CEC network.

Therefore, when the TV receiver 100 is connected to the video recorder 100 through the HDMI/CEC network in addition to the connection through the Ethernet 400, the TV receiver 100 can transmit a response request through the Ethernet 400 while receiving a response from the video recorder 200 through the Ethernet 400. Since the response includes the identifier of the video recorder 200 on the Ethernet 400, the TV receiver 100 can confirm that this response is one from the video recorder 200 that has transmitted the response request.

Therefore, the TV receiver 100 can detect that the TV receiver 100 is also connected to the video recorder 200 through the HDMI/CEC network and is in a state of being communicatable therewith. In addition, the TV receiver 100 can detect the identifier of the video recorder 200 on the HDMI/CEC network with reference to the source address of the response.

Figure 15:
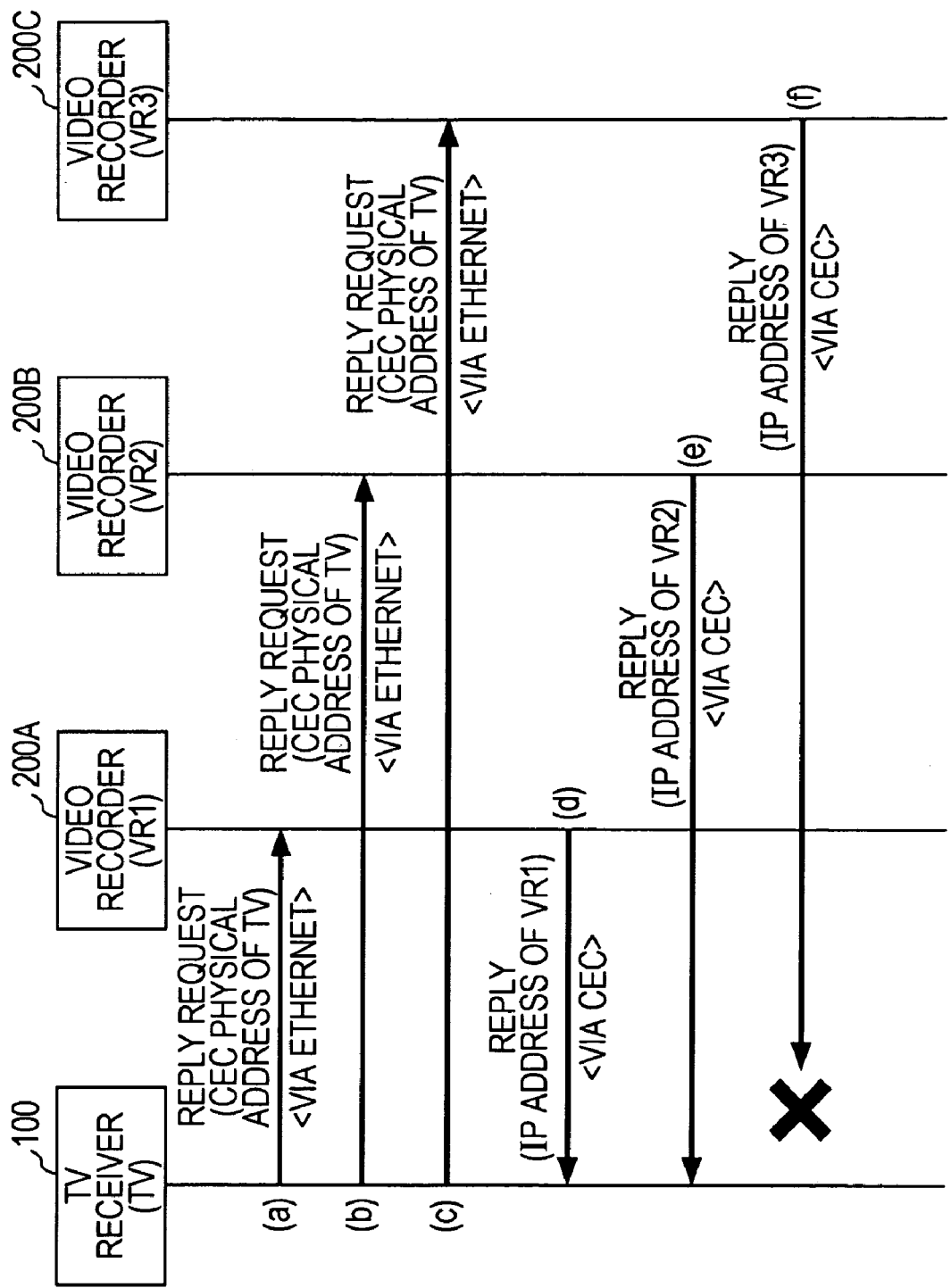
FIG. 15 is a diagram illustrating an example of a communication sequence including a response request from a TV receiver to each of video recorders through the Ethernet and a response from each video recorder to the TV receiver through CEC.

FIG. 15 is a diagram illustrating an example of a communication sequence for the response request from the TV receiver 100 to each of the video recorders 200A, 200B, and 200C and the response request from each of the video recorders 200A, 200B, and 200C to the TV receiver 200.

(a) The TV receiver (TV) 100 transmits a response request to the video recorder (VR1) 200A, which is being connected through the Ethernet 400, through the Ethernet 400. This response request includes, for example, a CEC physical address which is the identifier of the TV receiver 100 on the HDMI/CEC network.

(b) In addition, the TV receiver 100 transmits a response request to the video recorder (VR2) 200B, which is being connected through the Ethernet 400, through the Ethernet 400. This response request includes, for example, a CEC physical address which is the identifier of the TV receiver 100 on the HDMI/CEC network.

(c) In addition, the TV receiver 100 transmits a response request to the video recorder (VR3) 200C, which is being connected through the Ethernet 400, through the Ethernet 400. This response request includes, for example, a CEC physical address which is the identifier of the TV receiver 100 on the HDMI/CEC network.

(d) The video recorder (VR1) 200A transmits a response to the TV receiver 100 through the HDMI/CEC network. This response includes the identifier of the video recorder (VR1) 200A, such as the IP address thereof, on the Ethernet 400. In addition, the TV receiver 100 can receive the response because the video recorder (VR1) 200A is connected to the HDMI terminal 101 of the TV receiver 100.

Therefore, this response allows the TV receiver 100 to detect that it is also connected to the video recorder (VR1) 200A, which has been connected through the Ethernet, through the HDMI/CEC network and is in a state of being communicatable therewith. In addition, the TV receiver 100 can detect the identifier of the video recorder (VR1) 200A on the HDMI/CEC network with reference to the source address (CEC logic address) of the response. Therefore, the TV receiver 100 can recognize that the video recorder (VR1) 200A associated with this response is connected to the HDMI terminal 101.

(e) The video recorder (VR2) 200B transmits a response to the TV receiver 100 through the HDMI/CEC network. This response includes the identifier of the video recorder (VR2) 200V, such as the IP address thereof, on the Ethernet 400. In addition, the TV receiver 100 can receive the response because the video recorder (VR2) 200B is connected to the HDMI terminal 102 of the TV receiver 100.

Therefore, this response allows the TV receiver 100 to detect that it is also connected to the video recorder (VR2) 200B, which has been connected through the Ethernet 400, through the HDMI/CEC network and is in a state of being communicatable therewith. In addition, the TV receiver 100 can detect the identifier of the video recorder (VR2) 200B on the HDMI/CEC network with reference to the source address (CEC logic address) of the response. Therefore, the TV receiver 100 can recognize that the video recorder (VR2) 200B associated with this response is connected to the HDMI terminal 102.

(f) The video recorder (VR3) 200C transmits a response to the TV receiver 100 through the HDMI/CEC network. This response includes the identifier of the video recorder (VR3) 200C, such as the IP address thereof, on the Ethernet 400. In addition, the TV receiver 100 does not receive any response from the video recorder (VR3) 200C because the video recorder (VR3) 200C is not connected to the HDMI terminal of the TV receiver 100. Since the TV receiver 100 does not receive any response from the video recorder (VR3) 200C, it can be recognized that the video recorder (VR3) 200C is not connected to the HDMI/CEC network or is connected thereto in an out-of-communication state.

The TV receiver 100 can perform the following changing operation when it is also connected to the video recorder 200, which has been connected to the Ethernet 400, through the HDMI/CEC network. That is, the TV receiver 100 can change the state of receiving contents from the video recorder 200 from the state of receiving through the Ethernet 400 to the state of receiving through the HDMI/CEC network. The change of the receiving state may be automatically performed or may be performed by the user's changing operation.

Figure 16A:
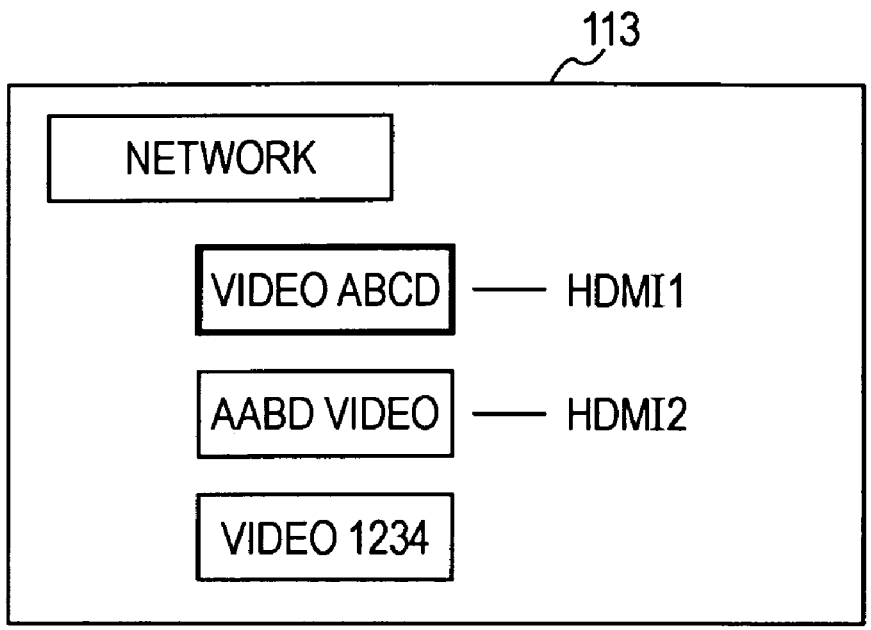
FIG. 16A is a diagram illustrating a display example of a display panel of a TV receiver when the user selects the category "network"

FIG. 16A illustrates an example of the display on a display panel 113 when the user selects, for example, the category "network". In this example, the display panel 113 displays the device names, "Video ABCD", "AABD Video", and "Video 1234" corresponding to the video recorders 200A, 200B, and 200C, respectively. In this example, the display panel 113 also displays the HDMI port numbers, "HDMI 1" and "HDMI 2", corresponding to the names of the respective DLNA devices, "Video ABCD" and "AAVD Video", which are connected to these HDMIs.

Since the TV receiver 100 performs the transmission of a response request through the Ethernet 400 and the reception of a response through the HDMI/CEC network as described above, the TV receiver 100 can find the following fact. That is, the TV receiver 100 finds that it is connected to the video recorders 200A and 200B not only through the Ethernet but also through the HDMI/CEC network.

Figure 16B:
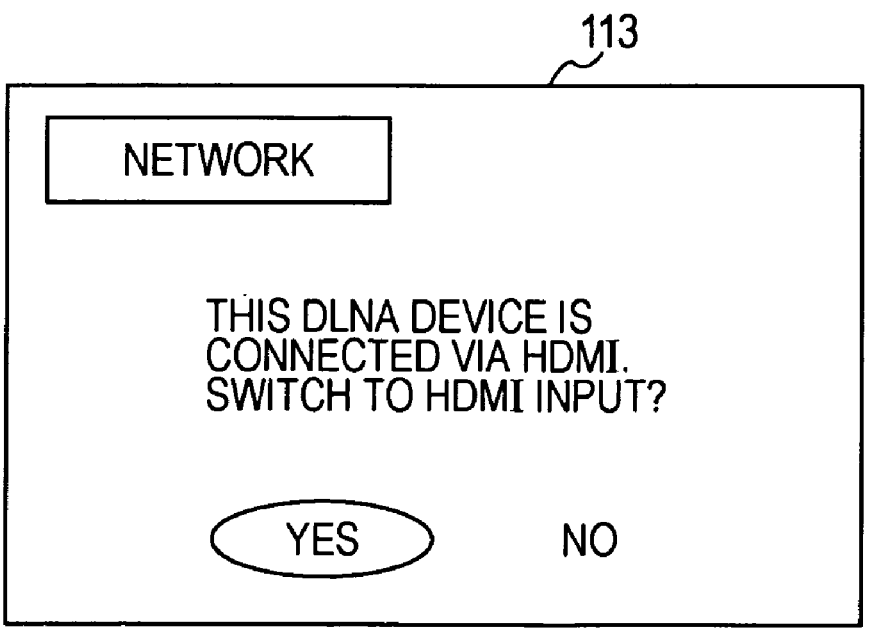
FIG. 16B is a diagram illustrating a display example of a display panel of a TV receiver when the a certain DLNA device (user-selected DLNA device) is selected by the user's operation from DLNA devices (DMS devices) connected to the TV receiver through the Ethernet and then connected using an HDMI cable.

FIG. 16B illustrates a screen of the display device 113 in the TV receiver 100A, for example, when the user selects the device name "Video ABCD" corresponding to the video recorder 200A from the device names displayed on the display panel 113 as described above.

That is, the display panel 113 displays a message that informs the user of the connection established using the HDMI cable. Furthermore, the display panel 113 informs the user of whether the user intends to change to the HDMI input. For example, the display panel 113 displays the inquiry of "Switch to HDMI input?". Then, the user is allowed to select "Yes" or "No". In the display example shown in FIG. 16B, the state of selecting "YES" is represented.

Thus, when the user selects the switching to the HDMI input, the TV receiver 100 changes the state of receiving contents from the video recorder 200 from the state of receiving through the Ethernet 400 to the state of receiving through the HDMI/CEC network. In this case, a control signal is transmitted from the TV receiver 100 to the video recorder 200A through the Ethernet 400 or the CEC. Then, the state of transmitting content data from the video recorder 200A is changed from the state of transmission through the Ethernet 400 to the state of transmission through the HDMI/CE network.

The response from the video recorders 200 connected to the respective HDMI terminals through the Ethernet 400 allows the TV receiver 100 of the AV system 10 shown in FIG. 1 to detect that the TV receiver 100 is also connected to the video recorder 200 through the Ethernet 400 and is in a state of being communicatable therewith.

In addition, the TV receiver 100 can detect the identifier of the video recorder 200 on the Ethernet 400 with reference to the source address of the response. Since the identifier on this Ethernet 400 is one unique to the device, the TV receiver 100 can specify the video recorder 200 with respect to the response.

Furthermore, the TV receiver 100 can employ the identifiers of the video recorders 200 on the Ethernet 400 to obtain information about the contents of the video recorders 200 connected to the respective HDMI terminals through the Ethernet 400. The content information may include information for qualifying contents, such as information about program names, recording time and date, channels, and performers.

Furthermore, the TV receiver 100 can display each of the HDMI terminals together with the corresponding information, such as a device name, associated with the identifier of the video recorder 200 connected to the HDMI terminal on the Ethernet 400. In this case, the user can easily distinguish among the video recorders connected to the respective HDMI terminals.

Furthermore, the response from the video recorders 200 connected through the Ethernet 400 through CEC allows the TV receiver 100 to detect that the TV receiver 100 is also connected to the video recorder 200 through the HDMI/CEC network and is in a state of being communicatable therewith.

In addition, the TV receiver 100 can detect the identifier of the video recorder 200 on the HDMI/CEC network with reference to the source address of the response. In this case, the TV receiver 100 can recognize the HDMI terminal connect to the video recorder associated with the response.

The TV receiver 100 can change the state of receiving contents from the video recorder 200 when the video recorder 200, which has been connected to the TV receiver 100 through the Ethernet 400, is also connected to the TV receiver 100 through the HDMI/CEC network. In other words, the TV receiver 100 can be changed from the state of receiving through the Ethernet 400 to the state of receiving through the HDMI/CEC network. Consequently, the TV receiver 100 can receive uncompressed high quality contents data from the video recorders 200.

2. Second Embodiment

Configuration of an AV System

FIG. 17 shows a configuration example of an audio and visual (AV) system 10A as a second embodiment of the present invention. In FIG. 17, the same reference symbols as in FIG. 1 are used to denote the corresponding portions and the detailed description thereof will be omitted.

The AV system 10A includes a TV receiver 100 that serves as a contents-receiving device and video recorders 200Aa, 200Ba, 200C, and 200D that serve as contents transmitter devices. Here, the TV receiver 100a has a DLNA client (DMP) function and serves as an HDMI sink device. In addition, each of the video recorders 200Aa, 200Ba, 200C, and 200D includes a DLNA server (DMS) and serves as an HDMI source device.

The TV receiver 100a includes three HDMI terminals (HDMI ports) 101 to 103 and one network terminal 125. In addition, each of the video recorders 200Aa, 200Ba, 200C, and 200D includes one HDMI terminal (HDMI port) 201 and one network terminal 215. The HDMI terminals 101 to 103 and 201 are provided for connecting HDMI cables, respectively. The network terminals 125 and 215 are provided for connecting Ethernet cables, respectively.

The HDMI terminal 101 of the TV receiver 100a is connected to the HDMI terminal 201 of the video recorder 200Aa through an HDMI cable 301. The HDMI terminal 102 of the TV receiver 100a is connected to the HDMI terminal 201 of the video recorder 200Ba through an HDMI cable 302. The HDMI terminal 103 of the TV receiver 100a is connected to the HDMI terminal 201 of the video recorder 200D through an HDMI cable 303.

The network terminal 125 of the TV receiver 100a is connected to the Ethernet 400 through an Ethernet cable 401. The network terminal 215 of the video recorder 200C is connected to the Ethernet 400 through an Ethernet cable 404. Here, the HDMI cables 301 to 303 serve as TMDS transmission lines, while the Ethernet 400 serves as a DLNA transmission line.

Furthermore, the TV receiver 100a and the video recorders 200Aa and 200Ba are e-HDMI-compatible devices. Thus, the video recorder 200Aa is connected to the Ethernet 400 through the HDMI cable 301, the TV receiver 100Aa, and the Ethernet cable 401. Similarly, the video recorder 200Ba is connected to the Ethernet 400 through the HDMI cable 302, the TV receiver 100Aa, and the Ethernet cable 401.

[Configuration Example of TV Receiver]

FIG. 13 is a diagram illustrating the configuration of the TV receiver 100a. In FIG. 18, the same reference symbols as in FIG. 2 are used to denote the corresponding portions and the detailed description thereof will be omitted. The TV receiver 100a has the same configuration as that of the TV receiver 100 shown in FIG. 2, except for the additional components, high-speed data line interface (high-speed DL I/Fs) 106-1 to 106-3.

The high-speed data line I/Fs 106-1 to 106-3 are bidirectional data transmission lines including predetermined lines (reserve line and HPD line in this embodiment) of the HDMI cables connected to the HDMI terminals 101 to 103. Each of the high-speed data line I/Fs 106-1 to 106-3 is inserted between the Ethernet I/F 124 and each of the HDMI terminals 101 to 103. The details of the high-speed data ling I/Fs 106-1 to 106-3 will be described later.

Since the TV receiver 100a includes the above-described high-speed data line I/Fs 106-1 to 106-3, the TV receiver 100a can perform the Ethernet communication (LAN communication) through the HDMI cables connected to the HDMI terminals 101 to 103. Other structural components and the operations thereof of the TV receiver 100a are similar to those of the TV receiver 100 shown in FIG. 2. Thus, the detailed description thereof will be omitted in the following description.

[Configuration Example of Video Recorder]

Figure 19:
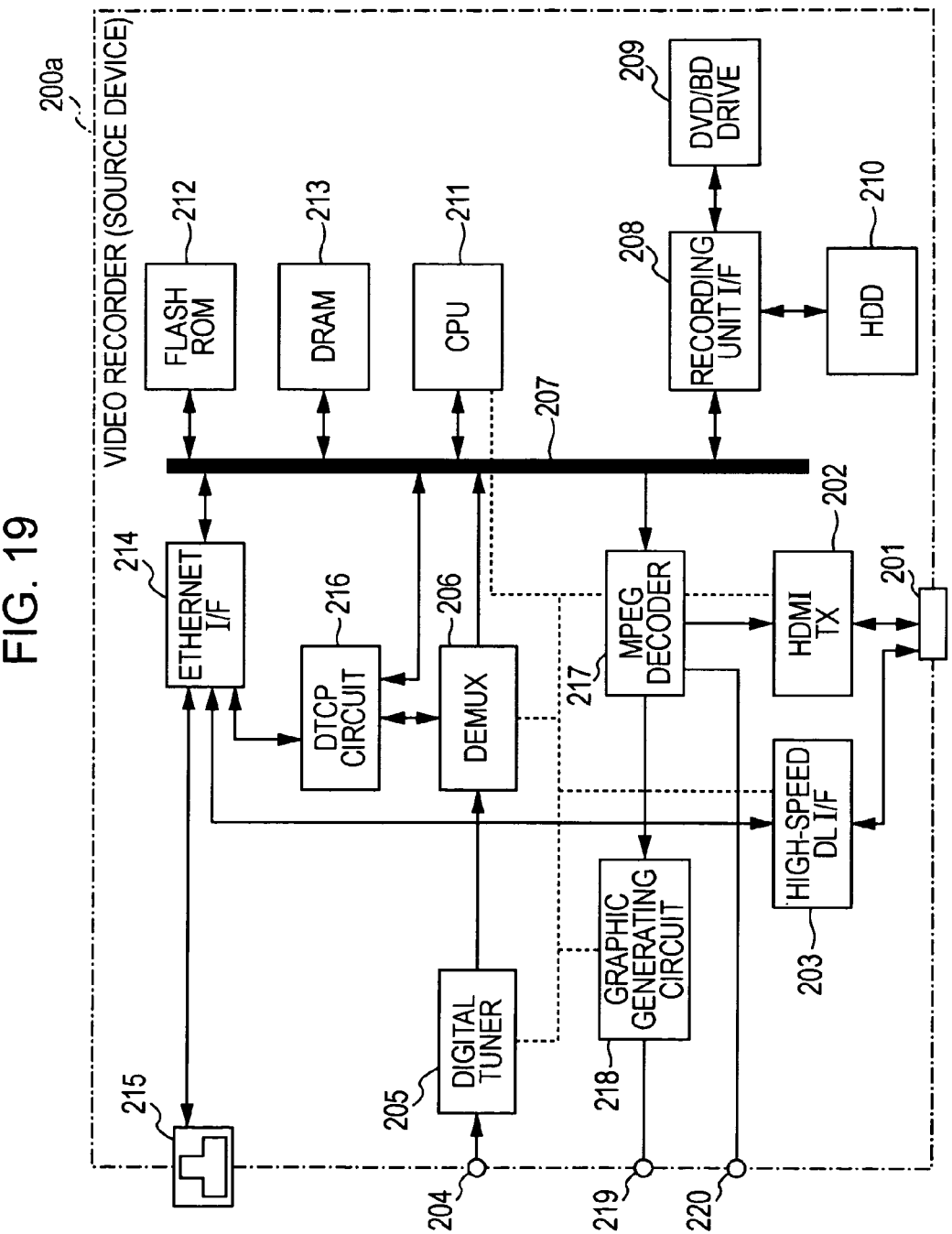
FIG. 19 is a block diagram illustrating a configuration example of a video recorder (DMS device, source device)

FIG. 19 is a diagram illustrating an example of the configuration of a video recorder 200a that corresponds to each of the video recorders 200Aa and 200Ba. In FIG. 19, the same reference symbols as in FIG. 3 are used to denote the corresponding portions and the detailed description thereof will be omitted. The video recorder 200a is further provided with a high-speed data line interface (high-speed DL I/F) in comparison with the video recorder 200 shown in FIG. 3.

The high-speed data line I/F 203 is a bidirectional data transmission line using predetermined lines (reserve line and HPD line in this embodiment) of the HDMI cable. The high-speed data line I/F 203 is inserted between the Ethernet I/F 214 and the HDMI terminal 201. The details of this high-speed data line I/F 203 will be described later.

Since the video recorder 200*a* includes the above-described high-speed data line I/F 203, the video recorder 200*a* can perform the Ethernet communication (LAN communication) through the HDMI cables connected to the HDMI terminals 101 to 103. Other structural components and the operations thereof of the video recorder 200*a* are similar to those of the video recorder 200 shown in FIG. 3. Thus, the detailed description thereof will be omitted in the following description.

[Configuration Example of High-Speed Data Line I/F]

Figure 20:
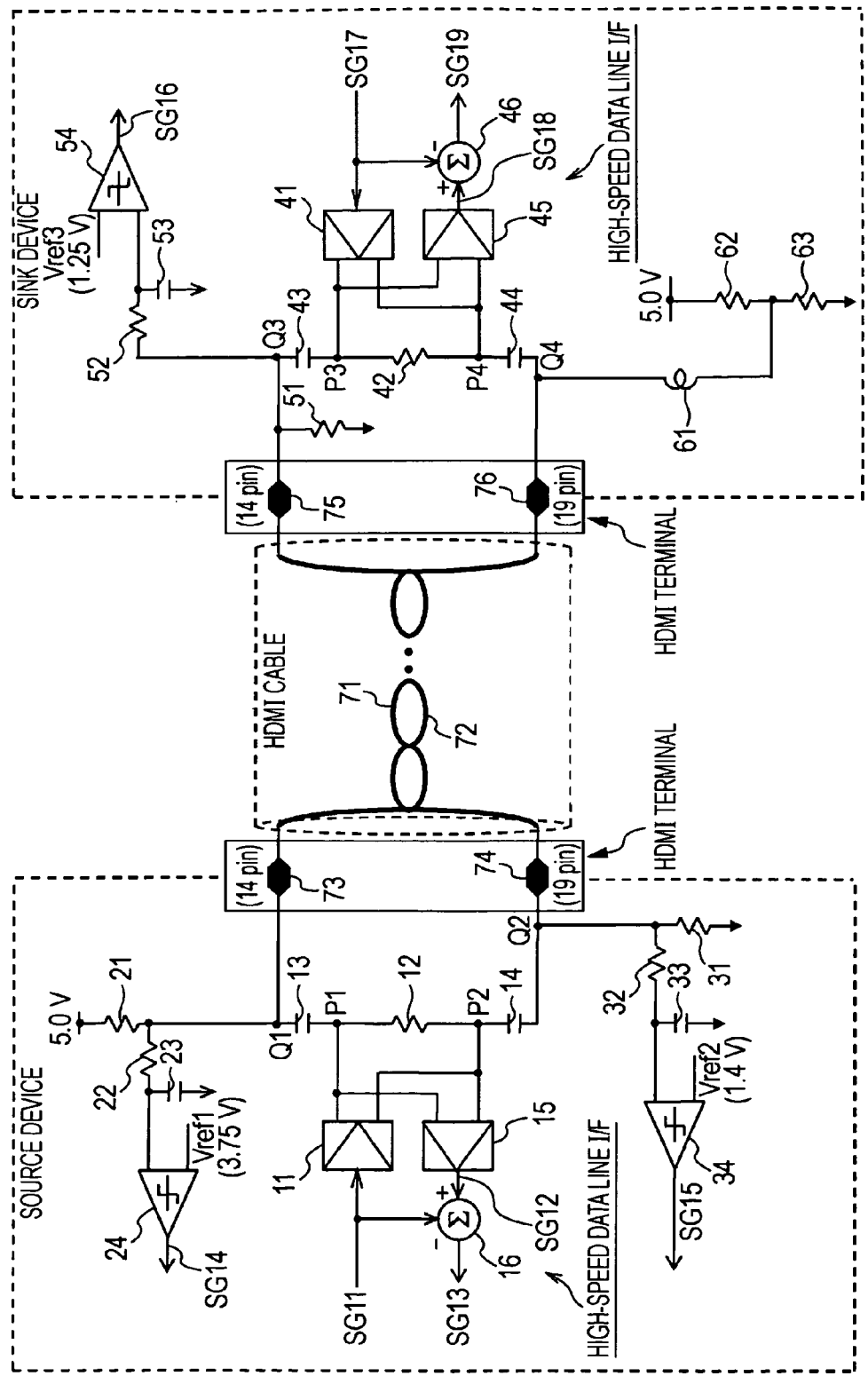
FIG. 20 is a connection diagram illustrating a configuration example of a high-speed data line interface (high-speed data line I/F) between a source device and a sink device.

FIG. 20 is a diagram illustrating a configuration example of a high-speed data line I/F between a source device and a sink device. The high-speed data line I/F includes a communication unit that performs a local area network (LAN) communication. This communication unit performs communications using a bidirectional data transmission line constructed of a pair of differential lines among plural lines that form an HDMI cable. In this embodiment, the pair of differential lines include a receiver line (Ether (+) line) corresponding to an empty (reserve) pins (14 pins) and an HPD line (Ether (−) line) corresponding to HPD pins (19 pins).

The source device includes a LAN signal transmission circuit 11, a terminating resistor 12, ac-coupling capacitors 13 and 14, a LAN signal receiving circuit 15, a subtraction circuit 16, a pull-up resistor 21, and a resistor 22 and a capacitor which form a low-pass filter. In addition, the source device further includes a comparator 24, a pull-down resistor 31, a resistor 32 and a capacitor 33 which form a low-pass filter, and a comparator 34. Here, a high-speed data line interface (high-speed data line I/F) includes a LAN signal transmission circuit 11, a terminating resistor 12, AC coupling capacitors 13 and 14, a LAN signal receiving circuit 15, and a subtraction circuit 16.

Between a power line (+5.0 V) and a ground line, a series circuit composed of the pull-up resistor 21, ac-coupling capacitor 413, terminating resistor 12, ac-coupling capacitor 14, and pull-down resistor 31 is connected. A junction point P1 between the ac-coupling capacitor 13 and the terminating resistor 12 is connected to the positive output side of the LAN signal transmission circuit 11, and also connected to the positive input side of the LAN signal receiving circuit 15. Furthermore, a junction point P2 between the ac-coupling capacitor 14 and the terminating resistor 12 is connected to the negative output side of the LAN signal transmission circuit 11, and also connected to the negative input side of the LAN-signal receiving circuit 15. To the input side of the LAN signal transmission circuit 11, a transmitted signal (transmitted data) SG11 is fed.

To the positive terminal of the subtraction circuit 16, an output signal SG12 of the LAN signal receiving circuit is fed. To the negative terminal of the subtraction circuit 16, the transmitted signal (transmitted data) SG11 is fed. In the subtraction circuit 16, the transmitted signal SG11 is subtracted from the output signal SG12 of the LAN signal receiving circuit 15, resulting in a received signal (received data).

A junction point Q1 between the pull-up resistor 21 and the ac-coupling capacitor 13 is connected to the ground line through the series circuit composed of the resistor 22 and the capacitor 23. An output signal of the low-pass filter obtained at the junction point between the resistor 22 and the capacitor 23 is fed to one of the input terminals of the comparator 24. In the comparator 24, the output signal of the low-pass filter is compared with a reference voltage Vref1 (+3.75 V) fed to the other input terminal. An output signal SG14 of the comparator 24 is fed to the control unit (CPU) of the source device. A junction point Q2 between the ac-coupling capacitor 14 and the pull-down resistor 31 is connected to the ground line through the series circuit of the resistor 32 and the capacitor 33. An output signal of the low-pass filter obtained at the junction point between the resistor 32 and capacitor 33 is fed to one of the input terminals of the comparator 34. In the comparator 34, the output signal of the low-pass filter is compared with a reference voltage Vref2 (+1.4 V) fed to the other input terminal. An output signal SG15 of the comparator 34 is fed to the control unit (CPU) of the source device.

The sink device includes a LAN signal transmission circuit 41, a terminating resistor 42, ac-coupling capacitors 43 and 44, a LAN signal receiving circuit 45, a subtraction circuit 46, and a pull-down resistor 51. The sink device also includes a resistor 52 and a capacitor 53 which form a low-pass filter, a comparator 54, a choke coil 61, a resistor 62, and a resistor 63. Here, the high-speed data line interface (high-speed data line I/F) is composed of the LAN signal transmission circuit 41, the terminating resistor 42, the ac-coupling capacitors 43 and 43, the LAN signal receiving circuit 45, and the subtraction circuit 46.

Between a power line (+5.0 V) and a ground line, a series circuit of the resistor 462 and resistor 463 is connected. Between a junction point between the resistor 62 and the resistor 63 and the ground line, a series circuit composed of the choke coil 61, the ac-coupling capacitor 44, the terminating resistor 42, the ac-coupling capacitor 443, and the pull-down resistor 451 is connected. A junction point P3 between the ac-coupling capacitor 43 and the terminating resistor 42 is connected to the positive output side of the LAN signal transmission circuit 41, and also connected to the positive input side of the LAN signal receiving circuit 45. A junction point P4 between the ac-coupling capacitor 44 and the terminating resistor 42 is connected to the negative output side of the LAN signal transmission circuit 41, and also connected to the negative input side of the LAN signal reception circuit 45. To the input side of the LAN signal transmission circuit 41, a transmitted signal (transmitted data) SG17 is fed.

To the positive terminal of the subtraction circuit 46, an output signal SG18 of the LAN signal reception circuit is fed. To the negative terminal of the subtraction circuit 46, the transmitted signal SG17 is fed. In the subtraction circuit 46, the transmitted signal SG17 is subtracted from the output signal SG18 of the LAN signal reception circuit 45 and a received signal (received data) SFG19 is then obtained.

A junction point Q3 between the pull-down resistor 51 and the ac-coupling capacitor 43 is connected to the ground line through a series circuit of the resistor 52 and the capacitor 53. An output signal of the low-pass filter developed at the junction point between the resistor 52 and the capacitor 53 is fed to one of the input terminals of the comparator 54. In the comparator 54, the output signal of the low-pass filter is compared with a reference voltage Vref3 (+1.25 V) fed to the other input terminal. An output signal SG16 of the comparator 54 is fed to the control unit (CPU) of the sink device.

A reserved line 71 and an HPD line 72 included in the HDMI cable constitute a differential twisted pair. The source-side end 73 of the reserved line 71 is coupled to the pin of the HDMI terminal, and the sink-side end of the reserved line 71 is coupled to the 14 pin of the HDMI terminal of the sink device. The source-side end 74 of the HPD line 72 is coupled to the 19 pin of the HDMI terminal, and the sink-side end 76 of the HPD line 72 is coupled to the 19 pin of the HDMI terminal. In the source device, the junction point Q1 between the pull-up resistor 21 and the ac-coupling capacitor is connected to the 14 pin of the HDMI terminal. The junction point Q2 between the pull-down resistor 31 and the ac-coupling capacitor 14 is connected to the 19 pin of the HDMI terminal. On the other hand, in the sink device, the junction point Q3 between the pull-down resistor 51 and ac-coupling capacitor 43 is connected to the 14 pin of the HDMI terminal 101. The junction point Q4 between the choke coil 61 and ac-coupling capacitor 44 is connected to the 19 pin of the HDMI terminal.

Next, the operation of the LAN communication performed by the high-speed data line interface configured as described above will be described.

In the source device, the transmitted signal (transmitted data) SG11 is fed to the input side of the LAN signal transmission circuit 11. Differential signals (a positive output signal and a negative output signal) associated with the transmitted signal SG11 are output from the LAN signal transmission circuit 11. The differential signals from the LAN signal transmission circuit 11 are fed to the junction points P1 and P2 respectively, and transmitted to the sink device over a pair of lines (the reserved line 71 and the HPD line 72) in the HDMI cable. In the sink device, the transmitted signal (transmitted data) SG17 is fed to the input side of the LAN signal transmission circuit 41. Differential signals (a positive output signal and a negative output signal) associated with the transmitted signal SG17 are output from the LAN signal transmission circuit 41. The differential signals from the LAN signal transmission circuit 41 are fed to the junction points P3 and P4 respectively, and transmitted to the source device over a pair of lines (the reserved line 71 and the HPD line 72) in the HDMI cable.

In the source device, the input side of the LAN signal reception circuit 15 is connected to the junction points P1 and P2. Thus, an additive signal between the transmitted signal associated with the differential signals (current signals) from the LAN signal transmission circuit 11 and the received signal associated with the differential signals from the sink device as mentioned above is obtained as the output signal SG12 of the LAN signal reception circuit 15. In the subtraction circuit 16, the transmitted signal SG11 is subtracted from the output signal SG12 of the LAN signal reception circuit 15. Therefore, the output signal SG13 of the subtraction circuit 16 corresponds to the transmitted signal (transmitted data) SG17 of the sink device.

In the sink device, the input side of the LAN signal reception circuit 45 is connected to the junction points P3 and P4. Thus, an additive signal between the transmitted signal associated with the differential signals (current signals) from the LAN signal transmission circuit 41 and the received signal associated with the differential signals from the source device as mentioned above is obtained as the output signal SG18 of the LAN signal reception circuit 45. In the subtraction circuit 46, the transmitted signal SG17 is subtracted from the output signal SG18 of the LAN signal reception circuit 45. Therefore, the output signal SG19 of the subtraction circuit 46 corresponds to the transmitted signal (transmitted data) SG11 of the source device.

Between the high-speed data line interface of the source device and the high-speed data line interface of the sink device, bidirectional LAN communication can be performed. In FIG. 20, the HPD line 72 is used for, in addition to the LAN communication, propagation to the source device of the fact that the HDMI cable has been plugged into the sink device at a DC bias level. Specifically, when the HDMI cable is plugged into the sink device, the resistors 62 and 63 and the choke coil 61 in the sink device bias the HPD line 72 to approximately 4 V through the 19 pin of the HDMI terminal. The source device uses the lo-pass filter, which is composed of the resistor 32 and capacitor 33, to sample the dc bias on the HPD line 72, and uses the comparator 34 to compare the dc bias with a reference voltage Vref2 (for example, 1.4 V).

When the HDMI cable is not plugged into the source device, the voltage at the 19 pin of the HDMI terminal of the source device is lower than the reference voltage Vref2 because of presence of the pull-down resistor 31. In contrast, when the HDMI cable is plugged into the sink device, the voltage at the 19 pin is higher than the reference voltage Vref2. Therefore, when the HDMI cable is plugged into the source device, the output signal SG15 of the comparator 34 assumes a high level. Otherwise, the output signal SG15 assumes a low level. Therefore, based on the output signal SG15 of the comparator 34, the control unit (CPU) of the source device can recognize whether the HDMI cable has been plugged into the sink device.

In FIG. 20, the devices interconnected at both the ends of the HDMI cable have the function of recognizing based on the dc bias potential on the reserved line 71 whether the device is able to perform LAN communication (hereinafter, referred to as e-HDMI compatible device) or not able to perform LAN communication (hereinafter, referred to as e-HDMI incompatible device). As mentioned above, the source device pulls up (+5 V) the reserved line 71 using the resistor 21, and the sink device pulls down the reserved line 71 using the resistor 51. The resistors 21 and 51 do not exist in the e-HDMI incompatible device.

The source device uses, as mentioned above, the comparator 24 to compare the dc potential on the reserved line 71, which has passed through the low-pass filter composed of the resistor 22 and capacitor 23, with the reference voltage Vref1. When the sink device is an e-HDMI compatible device and includes the pull-down resistor 51, the reserved line 71 has a voltage of 2.5 V. However, when the sink device is an e-HDMI incompatible device and does not include the pull-down resistor 51, the reserved line 71 has a voltage of 5 V in the presence of the pull-up resistor 21.

Therefore, when the reference voltage Vref1 is set to, for example, 3.75 V, if the sink device is an e-HDMI compatible device, the output signal SG14 of the comparator 24 assumes a low level. Otherwise, the output signal SG14 assumes a high level. The control unit (CPU) of the source device can recognize based on the output signal SG14 of the comparator 24 whether the sink device is an e-HDMI compatible device.

Likewise, the sink device uses, as mentioned above, the comparator 54 to compare the dc potential on the reserved line 71, which has passed through the low-pass filter composed of the resistor 52 and capacitor 53, with the reference voltage Vref3. When the source device is an e-HDMI compatible device and includes the pull-up resistor 21, the reserved line 71 has a voltage of 2.5 V. However, when the source device is an e-HDMI incompatible device and does not include the pull-up resistor 21, the reserved line 71 has a voltage of 0 V in the presence of the pull-down resistor 51.

When the reference voltage Vref3 is set to, for example, 1.25 V, if the source equipment 110 is an e-HDMI compatible device, the output signal SG16 of the comparator 54 assumes the high level. Otherwise, the output signal SG16 of the comparator 54 assumes the low level. Based on the output signal SG16 of the comparator 54, the control unit (CPU) of the sink device can recognize whether the source device is an e-HDMI compatible device.

According to the configuration example shown in FIG. 20, LAN communication is performed by bidirectional communication using a pair of differential transmission lines in the interface that performs video and audio data transmission, exchange and authentication of the connected device information, device control data communication, and LAN communication. Furthermore, in this interface, the state of interface connection is notified using the direct (dc) bias potential of at least one of the transmission lines. Therefore, it is possible to perform spatial separation without physically using the SCL line and the SDA line in LAN communication. As a result, a circuit for LAN communication can be formed regardless of electrical specifications provided for DDC, thereby realizing stable, reliable LAN communication inexpensively. The pull-up resistor 21 shown in FIG. 20 may be included in the HDMI cable other than the source device. In this case, the terminals of the pull-up resistor 21 are connected to the reserved line 71 and a line (signal line) coupled to a power source (power potential) among lines in the HDMI cable.

The pull-down resistor 51 and the resistor 63 shown in FIG. 20 may be included in the HDMI cable other than the sink device. In this case, the terminals of the pull-down resistor 51 are connected to the reserved line 71 and a line (ground line) coupled to the ground (reference potential) among lines in the HDMI cable. The terminals of the resistor 463 are connected onto the HPD line 502 and the line (ground line), which is coupled to the ground (reference potential), out of the lines included in the HDMI cable 610. As described above, in the AV system 10A shown in FIG. 17, the network terminal 215 of each of the video recorders 200Aa and 200Ba is not connected to the Ethernet 500. However, both the TV receiver 100a and the video recorders 200Aa and 200Ba are e-HDMI-compatible devices. Furthermore, the video recorders 200Aa and 200Ba are connected to the Ethernet 400 through the TV receiver 100Aa and the Ethernet cable 401, respectively.

Therefore, this AV system 10A has substantially the same connection configuration as that of the AV system 10 shown in FIG. 1 as described above. Thus, the TV receiver 100a and the video recorders 200Aa, 200Ba, 200C, and 200D can act in a manner similar to the AV system 10 shown in FIG. 1 and exert the same operation and effect as those of one shown in FIG. 1.

3. Modified Example

The above embodiment has been described so that an IP address as an identifier of the TV receiver 100 on the Ethernet 400 can be included in the response request transmitted from the TV receiver 100 to the video recorder 200 through the CEC. Alternatively, a MAC address may be included in replacement of the IP address. Furthermore, the above embodiment has been described so that the response transmitted from the video recorder 200 to the TV receiver 100 through the Ethernet 400 can include a CEC physical address as an identifier of the video recorder 200 on the HDMI/CE network. Alternatively, a CEC logic address may be included in replacement of the CEC physical address.

The above embodiment has been described so that the response transmitted from the TV receiver 100 to the video recorder 200 through the Ethernet 400 can include a CEC physical address as an identifier of the TV receiver 100 on the HDMI/CE network. Alternatively, a CEC logic address may be included in replacement of the CEC physical address. Furthermore, the above embodiment has been described so that the response transmitted from the video recorder 200 to the TV receiver 100 through the CEC can include an IP address as an identifier of the video recorder 200 on the Ethernet. Alternatively, a MAC address may be included in replacement of the IP address.

In the above embodiment, each of the TV receiver 100 and 100a is represented as a HDMI sink device having a DLNA client (DMP) function and served as a contents-receiving device. In addition, each of the video recorders 200 and 200a is represented as an HDMI source device having a DLNA server (DMS) function and served as a contents transmitting device. However, the contents-receiving device and the contents transmitting device according to the embodiment of the present invention is not limited to those described above.

Furthermore, in the configuration example illustrated in the above embodiment, the TV receivers 100 and 100a are connected to the video recorders 200 and 200a through the HDMI cables, respectively. However, the HDMI/CEC network is not limited to one which can be realized on a wired transmission path. Alternatively, it may be one realized on a wireless transmission path.

It should be understood by those skilled in the art that various modifications, combinations, sub-combinations and alterations may occur depending on design requirements and other factors insofar as they are within the scope of the appended claims or the equivalents thereof.

What is claimed is:
1. An electronic device comprising:
a response-request transmitting unit that, when the electronic device is connected to an external device through a first network, transmits a response request including a second identifier, the second identifier being an address of said response-request transmitting unit on a second network, to the external device through the first network;
a response receiving unit that receives a response from the external device including a first identifier, the first identifier being an address of said external device on said first network, wherein the response is transmitted through said second network using the second identifier as a destination address of the response, the response being transmitted in response to said response request; and
a control unit to detect, when the electronic device is connected to the external device through the first network, whether the electronic device is connected to the external device through the second network, based on whether the response receiving unit receives the response transmitted through said second network from said external device in response to said response request.

2. The electronic device according to claim 1, wherein said first network is an HDMI/CEC network and said second network is an Ethernet network.

3. The electronic device according to claim 2, further comprising:
a contents data receiving unit that receives contents data from said external device through said first network; and
a contents information obtaining unit that obtains contents information from said external device through said second network in response to a response from said external device, received by said response receiving unit.

4. The electronic device according to claim 2, further comprising:
a plurality of HDMI terminals; and
a display control unit that displays said plurality of HDMI terminals and information corresponding to said first identifier of said external device connected to said HDMI terminal on said second network in response to said response from said external device, received by said response receiving unit.

5. The electronic device according to claim 1, wherein said first network is an Ethernet network and said second network is an HDMI/CEC network.

6. The electronic device according to claim 5, further comprising:
- a first contents data receiving unit that receives contents data transmitted from said external device through said first network;
- a second contents data receiving unit that receives contents data transmitted from said external device through said second network; and
- a transmission line switching control unit that changes a state of receiving said contents data on said first contents data receiving unit to a state of receiving said contents data on said second contents data receiving unit in response to a response from said external device, received by said response receiving unit.

7. An electronic device comprising:
- a response-request receiving unit that receives a response request including a second identifier, the second identifier being an address of an external device on a second network, transmitted from said external device through a first network when the electronic device is connected to the external device through the first network; and
- a response transmitting unit transmitting a response including an own first identifier, the first identifier being an address of the response transmitting unit on said first network, to said external device, the response being transmitted through said second network using the second identifier as a destination address of the response, in response to said response request received by said response-request receiving unit.

8. The electronic device according to claim 7, wherein said first network is an HDMI/CEC network and said second network is an Ethernet network.

9. The electronic device according to claim 8, wherein
- a contents data transmitting unit that transmits contents data to said external device through said first network; and
- a contents information transmitting unit that transmits contents information to said external device through said second network.

10. The electronic device according to claim 7, wherein said first network is an Ethernet network and said second network is an HDMI/CEC network.

11. The electronic device according to claim 10, further comprising:
- a first contents data transmitting unit that transmits contents data to said external device through said first network;
- a second contents data transmitting unit that transmits contents data to said external device through said second network; and
- a transmission line switching control unit that changes a state of transmitting said contents data on said first contents data transmitting unit to a state of transmitting said contents data on said second contents data transmitting unit.

* * * * *